(12) United States Patent
Watson et al.

(10) Patent No.: US 11,126,955 B1
(45) Date of Patent: Sep. 21, 2021

(54) SENSOR DATA-BASED REORDERING OF ITEMS

(71) Applicant: Amazon Technologies, Inc., Seattle, WA (US)

(72) Inventors: Charles Robert Watson, Santa Clara, CA (US); David Charles Buuck, Prunedale, CA (US); Dave Jonathan Lefkow, Bellevue, WA (US); Joshua Golden Edwards, Palo Alto, CA (US); Lindsey Ann Bauer, Seattle, WA (US); Christa Stephens Glenn, Seattle, WA (US); Samuel Stevens Heyworth, Seattle, WA (US); Lara Marie Sosnosky, Kirkland, WA (US); Amirali Virani, Bellevue, WA (US); Hannah McClellan Richards, Boise, ID (US)

(73) Assignee: Amazon Technologies, Inc., Seattle, WA (US)

( * ) Notice: Subject to any disclaimer, the term of this patent is extended or adjusted under 35 U.S.C. 154(b) by 432 days.

(21) Appl. No.: 15/696,040

(22) Filed: Sep. 5, 2017

(51) Int. Cl.
*G06Q 30/06* (2012.01)
*G06Q 10/08* (2012.01)
*G16Y 10/45* (2020.01)

(52) U.S. Cl.
CPC ....... *G06Q 10/087* (2013.01); *G06Q 30/0601* (2013.01); *G06Q 30/0617* (2013.01); *G06Q 30/0633* (2013.01); *G16Y 10/45* (2020.01)

(58) Field of Classification Search
CPC ..... G06Q 30/06; G06Q 30/0601–0643; G06Q 30/08; G06Q 10/087; H04W 4/04; H04W 4/35; H04W 4/38; H04W 4/70
See application file for complete search history.

(56) References Cited

U.S. PATENT DOCUMENTS

| | | | |
|---|---|---|---|
| 9,959,437 B1* | 5/2018 | Ramos | ............... G06Q 30/0623 |
| 2002/0116301 A1* | 8/2002 | Chapman | ............. G06Q 10/087 |
| | | | 705/29 |

(Continued)

OTHER PUBLICATIONS

Amazon activates Dash Replenishment Service on select gadgets. By Natalie Gagliordi for Between the Lines | Jan. 19, 2016 (Year: 2016).*

(Continued)

*Primary Examiner* — William J Allen
(74) *Attorney, Agent, or Firm* — Lee & Hayes, P.C.

(57) ABSTRACT

A reorder device having an item tag reader and one or more sensors may facilitate the automatic reordering of an item for a customer. The item may be associated with an item tag that is placed on (or near) the reorder device. The reorder device may detect the item tag and transmit such data to an entity device, which may associate the reorder device and the item. The reorder device may periodically obtain weight measurements of the item that is placed on the reorder device, as well as a timestamp that indicates a time at which the weight measurements are obtained. Such data may be provided to the entity device, and an entity associated with the entity device may determine whether weight measurement satisfies an item threshold value. If so, additional inventory of the item may be ordered and delivered to the customer, without additional input from the customer.

20 Claims, 6 Drawing Sheets

(56) References Cited

U.S. PATENT DOCUMENTS

| | | | |
|---|---|---|---|
| 2008/0059323 A1* | 3/2008 | Chang | G06Q 30/02 |
| | | | 705/26.8 |
| 2016/0140526 A1* | 5/2016 | Cummins | G06Q 20/203 |
| | | | 705/28 |
| 2016/0275530 A1* | 9/2016 | Concannon | G06Q 30/0202 |
| 2017/0046773 A1* | 2/2017 | Hendricks, II | G06Q 30/0635 |
| 2018/0082038 A1* | 3/2018 | Blair, II | G06Q 30/0633 |
| 2019/0043103 A1* | 2/2019 | De Las Heras | G07F 9/026 |
| 2019/0295150 A1* | 9/2019 | High | G06Q 30/0635 |

OTHER PUBLICATIONS

Amazon adds GE, Samsung, Oster as Dash hardware partners. By Larry Dignan for Between the Lines | Oct. 1, 2015 (Year: 2015).*

* cited by examiner

SENSOR DATA-BASED REORDERING OF ITEMS

BACKGROUND

Electronic commerce typically requires a customer to take proactive action to place orders for goods and services (collectively referred to herein as "items"). For example, when a customer depletes a supply of a product, or nearly depletes the supply, the customer may place a new order for more supply of the product by interacting with a web site associated with an online marketplace and/or utilizing a mobile application associated with an entity that facilitates the order/purchase of the product.

Reliance on a customer to complete an order of a replenishment supply may not be ideal. Customers often forget to reorder products for many reasons. Sometimes the customer may discover that a container that holds a product is empty and may desire an immediate resupply, such as when the product has been exhausted or nearly exhausted and the customer desires more product at or near the moment of discovery. However, with proper planning, the customer could have ordered the resupply of the product in advance before the supply was exhausted or nearly exhausted. This problem may be particularly acute when multiple people collectively deplete the supply of product since a person that contributes to the depletion of the supply may not be tasked with reordering more of the product. This may be one of many reasons that consumable items like office supplies (e.g., pens, printer paper, staples, etc.), dog food, and toilet paper often are depleted before replenishments are obtained.

Keeping track of ongoing shopping needs is challenging. Many employers or families/households may find it difficult to organize requests from each employee, family member, or cohabitant. Further, shoppers may forget to purchase items and may only realize that they forgot to purchase certain items until after returning from a shopping trip.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
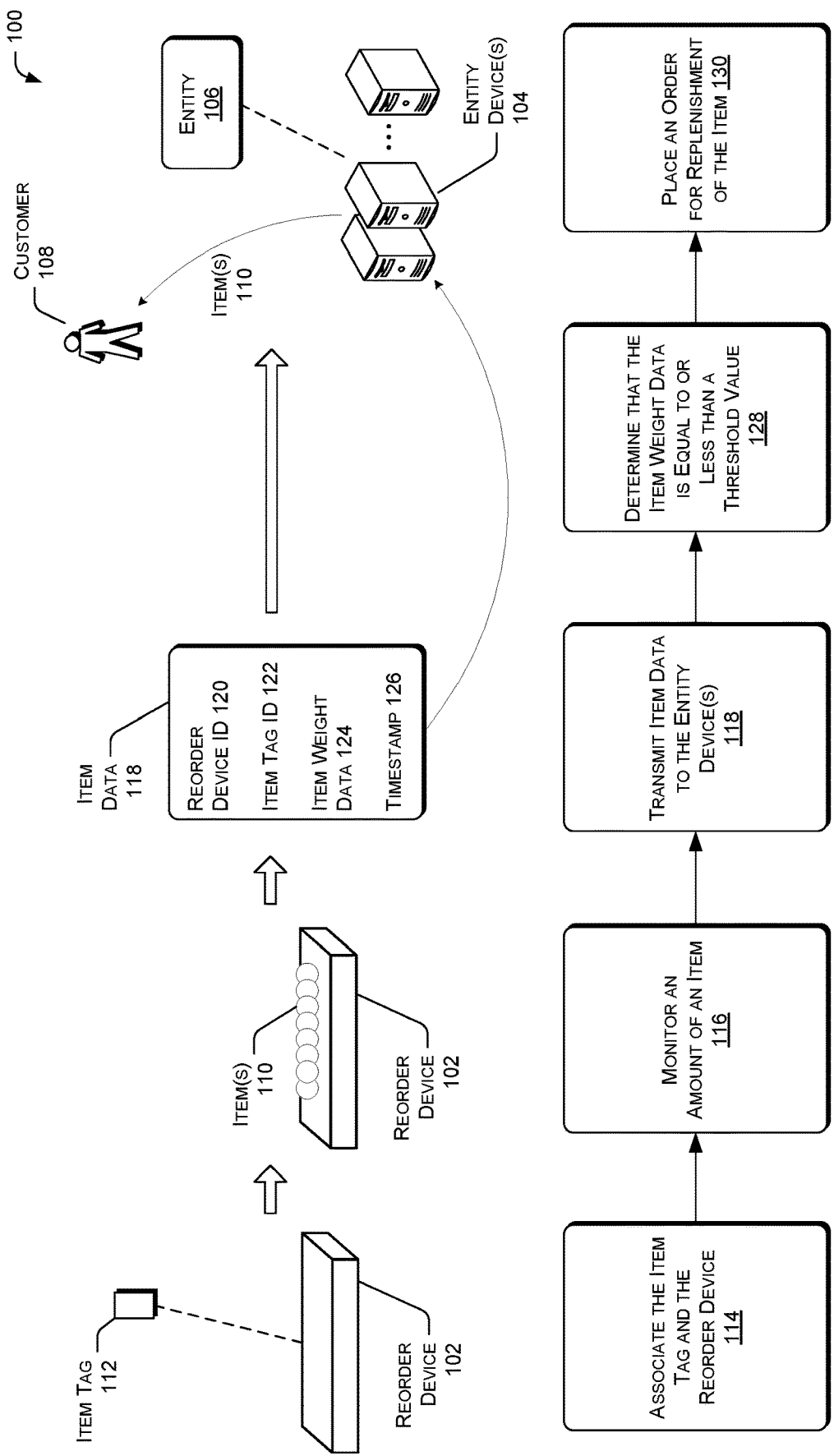
FIG. 1 is a pictorial flow diagram of an illustrative process performed by a reorder device and/or an entity device to facilitate the reordering of an item based on weight data obtained by the reorder device.

The systems and processes described herein are directed to a reorder device that is used to facilitate the reordering of items (e.g., products) for a customer. The reorder device may be a pad or mat in which items (e.g., pens, toilet paper, dog food, etc.) are placed on a surface of the reorder device. The reorder device may include a tag reader (e.g., a near field communication (NFC) reader, a radio-frequency identification (RFID) reader, etc.) that is configured to detect an item tag (e.g., an NFC tag, an RFID tag, etc.) associated with the item that is placed on the surface of the reorder device. Upon detecting the item tag associated with the item, the reorder device may associate itself with the item tag and/or the item, and store data indicating the identity of the item that is currently placed on the reorder device. Alternatively, or in addition, the reorder device may transmit data to an entity device that is involved in facilitating the reorder of the item. For instance, the reorder device may have a communication component (e.g., a WiFi component) that is configured to transmit a reorder device ID, an item tag ID, an item ID, etc., to the entity device, which allows the entity device to associate the reorder device with the item tag/item. As a result, the reorder device and/or the entity device may be aware that the item is placed on the surface of the reorder device. A customer (e.g., an individual, a business, etc.) may have multiple reorder devices that each contain a different item, and each item may be associated with a different item tag such that the reorder devices may detect and identify the particular items placed thereon. For the purposes of this discussion, the entity device(s) may be a server device that is associated with an entity, such as a cloud service. The reorder device may communicate (and send/receive data to/from) directly with the entity/entity device(s), may communicate with a customer device (e.g., a mobile device) of the customer, and/or may communicate with a network device that is local to the reorder device and that may communicate with the entity/entity device(s).

A sensor (e.g., a weight sensor) of the reorder device my periodically obtain weight measurements of the items that are placed on the surface of the reorder device. The weight measurements decreasing over time may indicate an extent to which a customer is removing the items from the reorder device and using/consuming the item(s). Instead of the customer having to remember to reorder the item when its supply becomes low, the reorder device and/or the entity device may determine a reorder threshold associated with the item. The reorder threshold may be based on the item itself, consumption patterns of the customer, consumption patterns of other customers, and so on. When the weight data obtained by the sensor(s) of the reorder device is equal to or below the reorder threshold, the reorder device and/or the entity device may cause the item to be reordered for, and delivered to, the customer. That way, the customer will receive additional inventory of the item before the customer's supply of the item is depleted. In some embodiments, the reorder device may facilitate the reordering of the item based on the obtained weight data.

However, in other embodiments, after obtaining a weight measurement for the item, the reorder device may send various types of data to the entity device, which may include the weight data, an identifier of the reorder device (e.g., a reorder ID), an identifier for the item (e.g., item ID), an identifier for the item tag associated with the item (e.g., item tag ID), and/or a timestamp that indicates a time at which the weight measurement was obtained. Based on this data, the entity device may determine that the weight data corresponds to a specific item of a particular customer. Based on weight measurements received over time, the entity device may determine the extent to which the item is being used/consumed by the customer. When the weight of the items placed on the reorder device is equal to or less than the reorder threshold for that item/customer, the entity device may cause additional inventory of the item to be ordered for, and delivered to, the customer. The customer may then be informed that additional items have been ordered for the customer, that the customer has been charged for the additional items, and/or a date at which the customer should expect to receive the additional items.

The apparatuses, techniques, and systems described herein may be implemented in a number of ways. Example implementations are provided below with reference to the figures.

FIG. 1 illustrates a pictorial flow diagram of an illustrative process 100 performed by a reorder device 102 and/or one or more entity devices 104 associated with an entity 106. The reorder device 102 may be associated with a customer 108 and one or more items 110 may be placed on a surface of the reorder device 102, where the one or more items 110 are the same type and/or brand (e.g., rolls of toilet paper, a container of pens, dog food, etc.). The reorder device 102 and/or the entity device(s) 104 may be configured to facilitate the reordering of the item(s) 110 on behalf of the customer 108. That way, the customer 108 need not interact with the reorder device 102 and/or the entity device(s) 104 in order to obtain additional inventory of the item(s) 110. The reorder device 102 and/or the entity device(s) 104 may monitor a current supply/inventory of the item(s) 110 and reorder the item 110 for the customer 108 when the current supply/inventory of the item(s) 110 is equal to or less than a threshold amount (e.g., number of items 110, a weight of the items 110, etc.). The customer 108 may then receive additional inventory of the item 110 before a current inventory of the item 110 is depleted and without the customer 108 having to place an order for that item 110.

For the purpose of this discussion, the entity 106 may offer items 110 (e.g., products, services, food items, etc.) to customers 108 via an electronic marketplace (e.g., a website, a mobile application, etc.) associated with the entity 106. That is, the customers 108 may access the electronic marketplace via corresponding customer devices for the purpose of searching for, viewing, selecting, acquiring (e.g., purchasing, leasing, renting, borrowing, lending, etc.), etc., items 110. The items 110, such as household supplies, office supplies, food items, etc., may be provided directly by the entity 106, or may be provided by the entity 106 on behalf of a different entity, such as one or more merchants. That is, via a website, an electronic marketplace, and/or a mobile application associated with the entity 106, the customers 108 may place orders for items 110 to be provided by the merchants.

Moreover, the customers 108 may include any person/individual or entity that interacts with the entity 106 for the purpose of ordering, acquiring, purchasing, etc., items 110 offered by the entity 106 and/or merchants. For instance, the customers 108 may include individual consumers that order/purchase items 110 for a household, as well as individuals/entities that order/purchase items 110 for a business/workplace. Such entities may include a company, a corporation, an educational institution, a non-profit entity, a religious institution (e.g., a church), an athletic team, and so on. The customers 108 may interact with the entity 106 and/or order/purchase items 110 using corresponding customer devices, which may include cellular telephones, tablet devices, laptop computers, desktop computers, gaming consoles, electronic book (eBook) reader devices, and so on.

The items 110 that are placed on a surface of the reorder device 102 and that are reordered by the entity 106 on behalf of the customer 108 may include any type of products. Such products may include household goods (e.g., soap, toilet paper, pet supplies, etc.), food items (e.g., baking ingredients, candy, dog food, cereal, etc.), office supplies (e.g., pens, pencils, staples, paper, etc.), and so on. In some embodiments, a single type of an item 110 is associated with (e.g., is placed on) a particular reorder device 102. For instance, a first reorder device 102 of the customer 108 may include toilet paper, a second reorder device 102 of the customer 108 may include a container of pens, and a third reorder device 102 of the customer 108 may include a container of dog food. In other embodiments, a top surface of a particular reorder device 102 may have multiple (and any number of) regions that are each associated with a different item 110. That is, a first type of item 110 (e.g., toilet paper) may be stored on a first region of the reorder device 102, a second type of item 110 (e.g., pens) may be stored on a second region of the reorder device 102, and so on. Each region may include sensors that capture weight data relating to the type of item 110 that is associated with that particular region. As a result, the reorder device 102 may be configured such that different types of items 110 may be stored/placed on different regions of a top surface of the reorder device 102.

The customer 108 may opt in or elect to participate in the automated/automatic reordering process for a particular item 110. If so, the customer 108 may obtain the reorder device 102 for that item 110, and may obtain multiple reorder devices 102 that each correspond to a different item 110. Alternatively, the entity 106 may provide/send one or more reorder devices 102 to a location associated with the customer 108 (e.g., a house, a workplace, etc.). For items 110 in which the customer 108 would like to request automatic reordering, the entity 106 may provide an item tag 112 that is associated with the item 110. The item tag 112 may be an NFC tag or an RFID tag that is uniquely associated with the item 110 and, as discussed in additional detail herein, may be included within a label, card, or packaging for the item 110.

At 114, the item tag 112 and the reorder device 102 may be associated with one another. As described in additional detail with respect to FIG. 2, the item tag 112 associated with the item 110 placed on the surface of the reorder device 102 may be placed on the reorder device 102, on at least one of the item(s) 110 themselves, or on a container that contains the items 110, where the container is situated on the surface of the reorder device 102. The reorder device 102 may include an item tag reader, such as an NFC reader or an RFID reader, that is configured to detect the item tag 112 when the item tag 112 is in proximity to the item tag reader (e.g., when the item tag 112 is within a predetermined distance from the item tag reader of the reorder device 102). Upon detecting the item tag 112, the reorder device 102 may store information about the item tag 112 for later use. Alternatively, the reorder device 102 may send data (e.g., a reorder device ID for the reorder device 102 and an item tag ID for the item tag 112) to the entity device 104 such that the reorder device 102 and the item tag 112 are associated with one another. Since the entity 106 stores an association between an item 110 and its corresponding item tag 112, the entity 106 may determine the identity of the particular item 110 associated with the reorder device 102. In other embodiments, and as explained in additional detail herein, the customer 108 may associate the reorder device 102 and the item 110 by inputting information/data via a website or a mobile application using his/her customer device.

As shown in FIG. 1, the item(s) 110 associated with the item tag 112 may be placed on the surface of the reorder device 102 by the customer 108. At 116, the reorder device 102 may monitor an amount of the item 110 that is currently placed on the reorder device 102. More particularly, the reorder device 102 may include one or more sensors that are configured to obtain data regarding the items 110 placed on the surface of the reorder device 102. The sensor(s) may include a weight sensor (e.g., a load sensor, a strain gauge on a load cell, etc.) that is configured to determine/detect a weight/mass of the items 110.

At 118, the reorder device 102 may transmit item data 118 to the entity device(s) 104. The item data 118 may include a reorder device ID 120 that uniquely identifies that particular reorder device 102, an item tag ID 122 that uniquely identifies the item tag 112 detected by the item tag reader of the reorder device 102, item weight data 124 that was detected/determined by the sensor(s) of the reorder device 102, and/or a timestamp 126 that indicates a time at which the item weight data 124 was obtained (also referred to herein as "timestamp data 126"). In some embodiments, the item weight data 124 may be the raw data that was obtained by the reorder device 102 and that represents a current weight/mass of the items 110 that are situated on the surface of the reorder device 102. In other embodiments, the reorder device 102 may maintain the item data 118 for further analysis. For the purposes of this discussion, the item weight data 124 may correspond to item weight data that indicates a current weight/mass of the items 110, item volume data that indicates a current volume of the items 110, and/or item number/quantity data that indicates a number or quantity of the items 110 currently situated on the reorder device 102.

At 128, the reorder device 102 and/or the entity device(s) 104/entity 106 may determine that the item weight data 124 is equal to or less than a threshold value. That is, the reorder device 102 may make such a determination, or the reorder device 102 may send the item weight data 124 to the entity device(s) 104 and the entity 106 may perform that determination. In either scenario, the threshold value may correspond to a remaining weight (e.g., 2 pounds, 8 ounces, etc.) or a remaining number (e.g., 2, 5, 8, etc.) of the item 110 that is currently placed on the surface of the reorder device 102 at the time the item weight data 124 was obtained. As stated herein, the items 110 may be placed directly on a surface of the reorder device 102 in which the sensors are located, or the items 110 may be within a container that is placed on that surface. The threshold value may also correspond to a remaining percentage of the item 110 (e.g., 20%, 30%, etc.) in view of a previous weight of the item 110 that was initially placed on the reorder device 102. If the percentage remaining of the item 110 is equal to, or falls below, that threshold percentage, the entity 106 may determine that additional inventory of the item 110 should be automatically ordered for the customer 108 and delivered to a location associated with the customer 108. If not, the reorder device 102 may continue to obtain and transmit additional item weight data 124 of the item 110 at subsequent times.

At 130, the reorder device 102 and/or the entity device(s) 104/entity 106 may place an order for replenishment of the item 110. In some embodiments, the order for additional inventory of the item 110 may be performed based on a determination that the weight of the item 110 currently on the reorder device 102 is at or below the threshold value. In some embodiments, the item data 118 obtained/determined by the reorder device 102 may be transmitted directly to the entity device(s) 104/entity 106, which may then determine whether an order for additional inventory of the item 110 should be placed for the customer 108. However, in other embodiments, the reorder device 102 and/or the entity device(s) 104/entity 106 may initiate the reorder as a result of the reorder device 102 generating a signal for transmission via an antenna of the reorder device 102 to a network device (e.g., a modem, a router, a computing device, etc.). The network device may be located locally relative to the reorder device 102, and within a range of the antenna to receive short transmission signals, such as Bluetooth signals, WiFi signals, and/or other short range radio communications. The signal may include an identifier that is unique for at least the customer 108 or the location associated with the customer 108. The signal may be relayed by the network device to the entity device(s) 104. The entity device(s) 104 may be located remote from the network device, such as a number of miles away, in a different region, or possibly in a different state or country. The network device may be in communication with the entity device(s) 104 using existing wired or wireless networks, such as mobile telephone networks, wide area networks, and/or other standard networks that facilitate exchange of data across distances. The signal may be used to prompt a reorder of the item 110 without direct customer action in initiating the order other than customer interaction of placing the item 110 on the surface of the reorder device 102 (or within a container resting on the surface of the reorder device 102). In some embodiments, the signal or item data 118 sent by the reorder device 102 may be mapped to a specific product, a specific brand, a manufacturer, and/or a size or quantity which is to be ordered for the replenishment. The mapping may be maintained by the reorder device 102, the network device, and/or the entity device(s) 104. Moreover, it is contemplated that the reorder device 102 itself may obtain the item data 118, determine that an inventory of the item 110 is low, and/or trigger a reorder of the item 110 on behalf of the customer 108.

Accordingly, the diagram/system illustrated in FIG. 1 allows for a customer 108 to place the reorder device 102 on a flat surface, such as a counter or shelf, in which the customer 108 may store items 110. Based on data obtained by the reorder device 102, the entity 106 may identity which item 110 is placed on which reorder device 102, and may determine how much of the item 110 is remaining. As the current inventory of the item 110 residing on the reorder device 102 decreases, the entity 106 may reorder the item 110 on behalf of the customer 108 so that the customer 108 will receive additional inventory of the item 110 before the current inventory of the item 110 is depleted/runs out.

Figure 2:
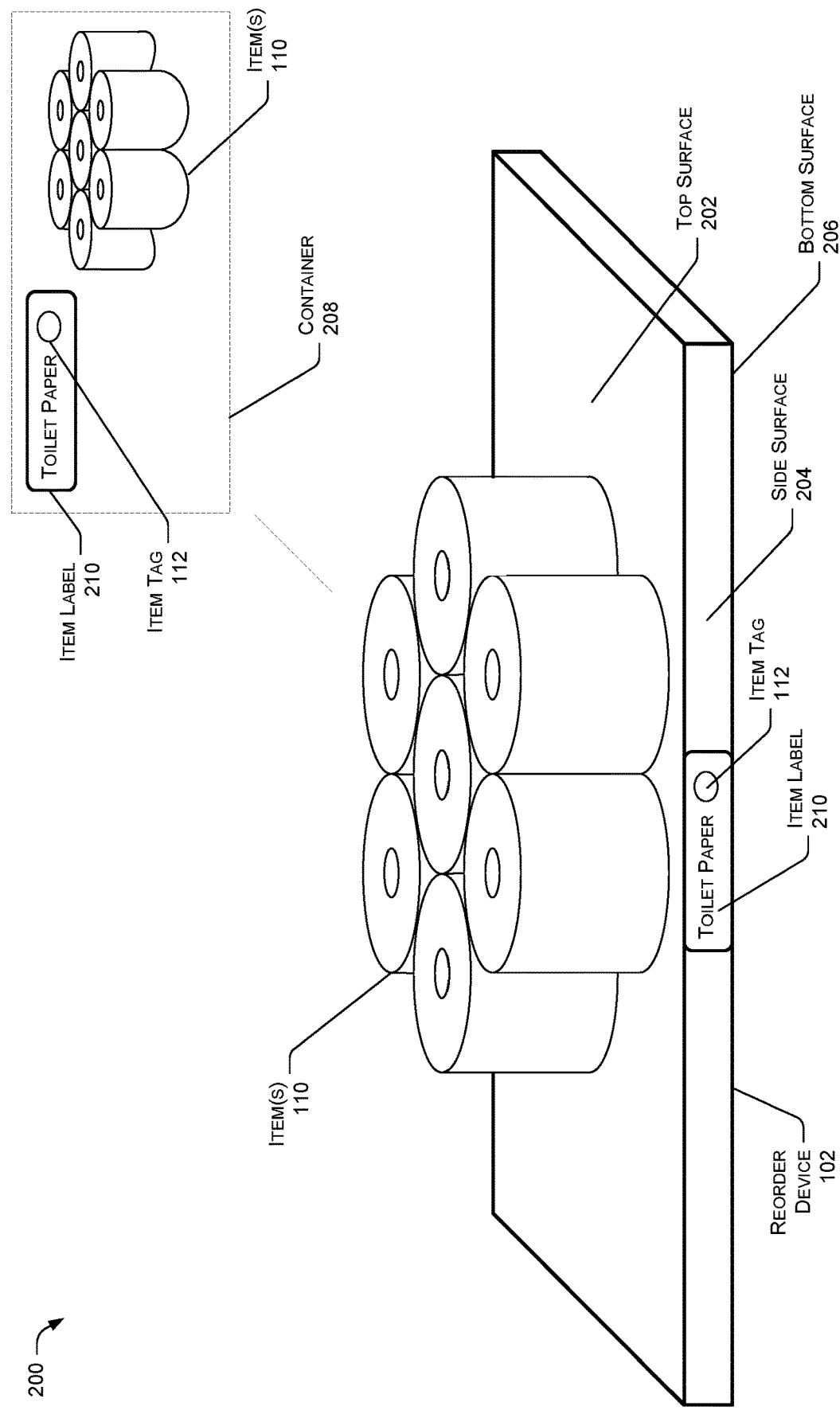
FIG. 2 is a block diagram of a reorder device, items placed thereon, and an item tag associated with the items.

FIG. 2 illustrates a diagram 200 of a reorder device that captures data used to facilitate the automatic reordering of items for a customer. As shown in FIG. 2, the diagram 200 includes the reorder device 102, which may have a top surface 202, one or more side surfaces 204, and a bottom surface 206. One or more items 110 may be placed on the top surface 202 of the reorder device 102, and the bottom surface 206 may be adjacent to (e.g., in contact with) a flat or substantially flat surface, such as a counter, table, or a shelf Although the reorder device 102 may be of any shape, depth, or size, the reorder device 102 may be a mat or pad in which items 110 are placed thereon. As stated above, a customer 108 may opt in, or agree to, the automatic reordering of certain items 110. Provided that the customer 108 would like the entity 106 to automatically reorder items 110 on behalf of the customer 108, the entity 106 may provide the reorder device 102 to the customer 108, or the customer 108 may obtain the reorder device 102 from a different entity/source. The customer 108 may also receive or otherwise obtain an item tag 112 associated with the item 110. For the purposes of FIG. 2, although the item 110 may include any type of product, the item 110 is toilet paper.

Once the customer 108 possesses the reorder device 102, the item 110, and the item tag 112, the customer 108 may place the item 110 on the top surface 202 of the reorder device 102. The top surface 202 of the reorder device 102 may include one or more sensors, which may include weight sensors that are configured to determine a weight of the item(s) 110 that are currently placed on the top surface 202 of the reorder device 102. Prior to determining the weight of the item(s) 110 placed on the reorder device 102, the reorder device 102 and/or the entity 106 may determine the identity of the items 110 that are to be, or that have been, placed on the reorder device 102. In order to associate the reorder device 102 with the item 110, the item tag 112 (e.g., an NFC tag, an RFID tag, etc.) associated with the item 110 may be placed on the item 110 itself, on the reorder device 102, and/or on a container 208 (e.g., a bin, a jar/glass/cup, a plate/dish, a strap, etc.) in which the items 110 are placed within/on. The container 208 may also dispense the item 110, such as a box of tissue paper or package of baby wipes that dispenses tissue paper and baby wipes, respectively. An item tag reader (e.g., an NFC reader, an RFID reader, etc.) of the reorder device 102 may detect the item tag 112. Since the item tag 112 has been previously associated with the item 110, the reorder device 102 may determine the identity of the item 110. Alternatively, or in addition, the reorder device 102 may send an identifier of the reorder device 102 (e.g., a reorder device ID 120) and an identifier of the item tag 112 (e.g., an item tag ID 122) to the entity device(s) 104. That way, the entity 106 may determine the identity of the items 110 that will be, or have been, placed on the reorder device 102, and the item tag reader/item tag 112 may allow the reorder device 102 to be paired to the item 110. Data subsequently obtained by the reorder device 102 will be associated with the customer 108 and that specific item 110 (e.g., toilet paper).

In some embodiments, the association between the reorder device 102 and the item 110 may occur without using the item tag reader of the reorder device 102, or the reorder device 102 may not possess an item tag reader. In these embodiments, the customer 108 may cause the item 110 to be associated with the reorder device 102. For instance, via a website and/or a mobile application that are associated with the entity 106 and that are accessible via a customer device, the customer 108 may indicate that a particular item 110 (e.g., toilet paper, a type of cereal, etc.) is to be placed on the top surface 202 of the reorder device 102. Such data may include an item identifier associated with the item 110, a name of the item 110, a reorder device ID 120 of the reorder device 102, an identity of the customer 108, and so on. The mobile application/website may transmit the data/information input by the customer 108 to the entity device(s) 104, which may then transmit such data/information to the reorder device 102. Then, when the sensor(s) of the reorder device 102 determine an amount of the item 110 currently located on the top surface 202 of the reorder device 102, the reorder device 102 may maintain and/or transmit the item ID and the amount data (e.g., toilet paper, 50% remaining; toilet paper, 30% remaining; etc.). In other embodiments, the entity 106 may maintain a lookup table, database, data structure, etc. that maps the item ID of the item 110 to the item ID and/or the reorder device ID 120 of the reorder device 102. As a result, provided that the customer 108 associates the item 110 with the reorder device 102, the reorder device 102 may only have to transmit its reorder device 120 ID and the item weight data, and the lookup table may be used to determine the item 110 that is currently associated with, and placed on the top surface 202 of, the reorder device 102.

The item tag reader of the reorder device 102 may detect the item tag 112 associated with the item 110 provided that the item tag 112 is within a threshold distance (e.g., 1 inch, 2 inches, 4 inches, etc.) from the item tag reader. As a result, the item tag 112 may be placed on the items 110 themselves, or on a packaging of the items 110. The item tag 112 may also be placed on a surface of the reorder device 102, such as on the top surface 202 of the reorder device 102 or one of the side surfaces 204 of the reorder device 102. In some embodiments, the items 110 may not be placed directly on the top surface 202 of the reorder device 102, and may instead be placed within a container 208 that is to hold or contain the items 110. The container 208 may be placed on the top surface 202 of the reorder device 102, and the item tag 112 may be placed on, or affixed to, the container 208.

The item tag 112 may be of any size, shape, or type, and may be a small sticker having an unpowered NFC chip. The item tag 112 may be configured such that it can be detected by the item tag reader (e.g., an NFC reader) of the reorder device 102. The item tag 112 may also store network credentials that may be determined by the entity 106, that may be specific to a customer 108, and that may be encrypted/transmitted using one or more security techniques. The item tags 112 may also be printed or reprogrammed by the entity 106 or by a third party merchant that offers the item 110 associated with the item tag 112. Moreover, the item tags 112 may be specific to a particular third party merchant, a particular location (e.g., an address, a supply room, etc.), a particular customer 108, a particular billing code, etc., and the item tags 112 may include such information/data. For example, such information/data may be stored within the item tag 112 and/or displayed thereon.

In some embodiments, the item tag 112 may be incorporated within an item label 210. The item label 210 may be of any size, shape (e.g., circular, rectangular, square-shaped, etc.), and/or material (e.g., paper, plastic, metal, etc.). The item label 210 may also include any type of design, wording, colors, branding, item-specific artwork, etc., and may identify or represent the particular item 110 that is associated with the item tag 112. For instance, the item label 210 may be a paper, plastic, laminated, etc., faceplate that identifies the item 110 and that is detachably affixed to the container 208 that contains the item 110. The item tags 112 may be created/printed by the entity 106 or a different entity/source. In certain embodiments, the item label 210 may be placed in a dedicated location on the container 208 and/or the reorder device 102. Since the customer 108 may have multiple reorder devices 102 that are each associated with a different item 110, the item labels 210 may identify which reorder device 102 is associated with which item 110. For instance, in the context of FIG. 2, the item label 210 may include a name of the item 110 (e.g., toilet paper), a manufacturer of the item 110 (e.g., ABC company), and/or branding associated with the item/manufacturer (e.g., a logo, a color scheme, a particular type/font of text, etc.). As a result, the item tag 112 may be used to associate a particular item 110 with a reorder device 102 and to identify the item 110 to the customer 108. For instance, a supply room, closet, pantry, etc., may have multiple reorder devices 102 that each store a different type of item 110. The item tag 112 for each item 110 may be incorporated within a different item label 210 that identifies the specific item 110 and that assists the customer 108 in organizing his/her items 110.

As noted above, the item tag 112 associated with an item 110 may be placed on or within a dedicated slot of the reorder device 102. The dedicated slot may be positioned adjacent to, or within a predetermined distance from, an item tag reader of the reorder device 102. In some embodiments, the item tag reader may only be able to detect item tags 112 that are within a certain distance, such as an inch, 3-4 inches, etc. As a result, the item tag reader of the reorder device 102 may be configured to detect an item tag 112 placed on or within the dedicated slot of that reorder device 102, but may be unable to detect item tags 112 that are not in proximity to the item tag reader. That is, the reorder device 102 may be unable to detect item tags 112 associated with neighboring or adjacent reorder devices 102, such as reorder devices 102 that are placed on the same counter or shelf. Provided that the items 110 are stored within a container 208 that is placed on the top surface 202 of the reorder device 102, the container 208 and the reorder device 102 may be configured/designed in such a way as to ensure an alignment and proximity with respect to the item tag 112 and the item tag reader.

In some embodiments, the item tag 112 need not be incorporated within the item label 210. For instance, the container 208 may be a cardboard box that the items 110 were shipped within, or some type of container 208 that is specifically used for containing/storing the items 110 when the items 110 are placed on the top surface 202 of the reorder device 102. This box may include designs, artwork, wording, colors, branding, etc. that are specific to the item 110 and/or the entity that offers, distributes, manufactures, etc., the item 110. In the context of FIG. 2, the container 208 may be a cardboard box that was used to transport/ship the toilet paper to the location of the customer 108 at which the reorder device 102 is located. In this scenario, the item label 210 may include such designs, artwork, wording, colors, branding, etc., and may be displayed on one or more exterior surfaces of the box. The item tag 112 associated with the item 110 may be placed in some location on the box/container 208, but not necessarily on, or within, the item label 210 itself. For example, the item tag 112 may be permanently or detachably affixed to an exterior or interior surface of the box (e.g., a sticker placed on an exterior surface of the box), which is placed on the top surface 202 of the reorder device 102. As a result, the box in which the items 110 were shipped to the customer 108 may be the container 208 that is used to contain the items 110 that are placed on the reorder device 102. In certain embodiments, the item label 210 may be on the item 110 itself, and the item tag 112 may be permanently/detachably affixed to a different location on the item 110. As discussed herein, the item tag reader of a first reorder device 102 may only be able to detect an item tag 112 that is in close proximity to the first reorder device 102 (e.g., within an inch, 3-4 inches, etc.), but would not be able to detect item tags 112 for items 110 that are placed on adjacent or neighboring reorder devices 102. Such a configuration may prevent a reorder device 102 from inadvertently detecting an item tag 112 for an item 110 placed on a different reorder device 102, thereby reducing the likelihood of the cross-reading of item tags 112 by item tag readers of different reorder devices 102.

Figure 3:
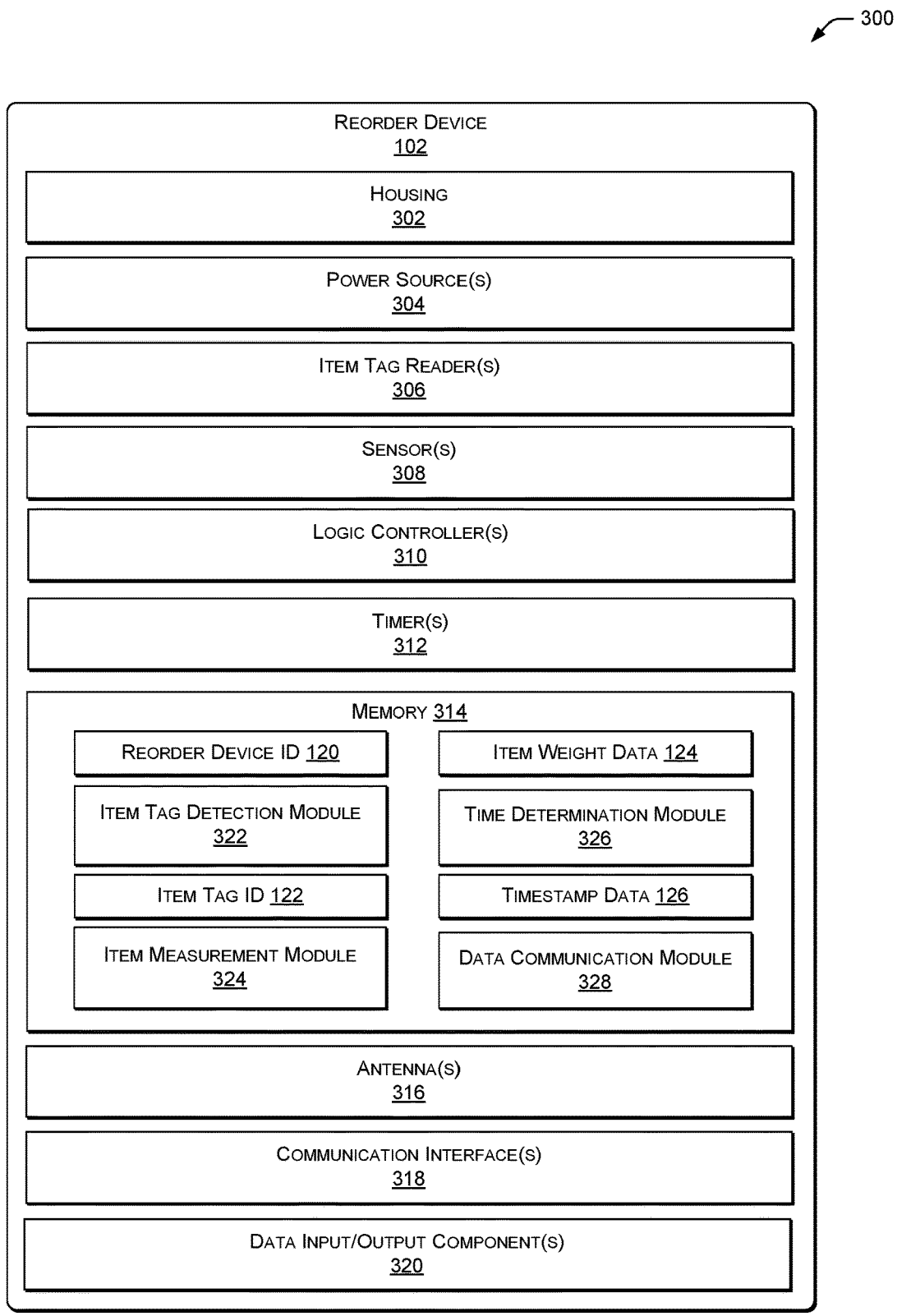
FIG. 3 is a block diagram of components of a reorder device that captures weight data associated with items placed thereon.

FIG. 3 illustrates a block diagram showing an illustrative computing architecture of an automatic reorder device, which may be the same as or similar to the reorder device 102 shown in FIG. 1. The reorder device 102 may include a housing 302. In some embodiments, the housing 302 may contain components of the reorder device 102, as set forth below. The housing 302 may be composed of any type of material (e.g., plastic, metal, etc.), and may serve to prevent the components of the reorder device 102 from being damaged.

The reorder device 102 may include one or more power sources 304 to provide power to one or more components of the reorder device 102. The power source 304 may include a battery, which may include a one-time use battery or a rechargeable battery. However, the power source 304 may rely on power from another source providing alternating current (AC) power, and may be a power inverter. For instance, the reorder device 102 may be powered via a power cord that is coupled to the reorder device 102 and that is detachably connected to a power outlet, such as a wall outlet. In some embodiments, the reorder device 102 may include a power level detector that is configured to determine a power level of the reorder device 102, which may be represented by a set of characters (e.g., full, half, low, etc.), a numerical value (e.g., 0.8. 0.4, etc.), a percentage (e.g., 80%, 40%, etc.), etc. that indicates a power level of a battery of the reorder device 102. The power level may be transmitted by the reorder device 102 to the entity device(s) 104, which may track the power level of the reorder device 102 over time. If the power level of the reorder device 102 becomes low, such as by being below a threshold amount/value, the entity 106 may trigger the order of a new battery for the reorder device 102 on behalf of the customer 108. The entity 106 may cause the new battery to be delivered to the customer 108, such as the location at which the reorder device 102 is located. In some embodiments, the entity 106 may notify the customer 108 of the power level via a customer device of the customer 108, such as via an e-mail message, a text message, a mobile application, a website, etc. Such a notification may include various information associated with the reorder device 102/customer 108, such as a reorder device ID 120 of the reorder device 102, a customer ID, a location of the reorder device 102, and/or an identity of the item 112 stored on the reorder device 102.

Moreover, the reorder device 102 may include one or more item tag readers 306, which may include an NFC reader, an RFID reader, a barcode scanner, a Bluetooth component, and so on. The item tag reader 306 may be configured to detect an item tag 112 (e.g., an NFC tag, an RFID tag, a barcode, etc.) when the item tag 112 is in proximity to, or is within a threshold distance from (e.g., 1 inch, 2 inches, 4 inches, 6 inches, etc.) the item tag reader 306. For instance, provided that the customer 108 places the item tag 112 on a surface of the reorder device 102, on the item 110 that is placed on the reorder device 102, or on a container 208 that is placed on the reorder device 102 and that contains the item 110, the item tag reader 306 may detect the item tag 112. In some embodiments the reorder device 102 may identify the item 110 based on its associated item tag 112. However, in other embodiments, the reorder device 102 may send data associated with the reorder device 102 (e.g., a reorder device ID 120) and/or data associated with the item tag 112 (e.g., an item tag ID 122) to the entity device(s) 104. Based on this data, the reorder device 102 may determine that a particular item 110 is associated with the reorder device 102. In some embodiments, the range in which the item tag reader 306 is able to detect an item tag 112 may be relatively short. In doing so, the item tags 112 are to be placed as close as possible to the item tag reader 306, and the item tag reader 306 of a first reorder device 102 likely will not be able to detect item tags 112 associated with items 110 that are stored on other reorder devices 102, and vice versa.

In certain embodiments, provided that the item tag reader(s) 306 includes an NFC reader, the NFC reader may have a mode that allows the customer 108 to detect the item tag 112 of the item 110 using an NFC reader included on a mobile device (e.g., a mobile telephone, a tablet device, etc.) of the customer 108. This mode may be referred to herein as a "tag emulation mode." This mode may be activated in instances in which the item 110 is not provided to the customer 108 by the entity 106, which may indicate that the item tag 112 is not associated with the entity 106 or that the customer 108 does not possess an item tag 112 that is associated with the item 110. In this scenario, the customer 108 may set or determine a virtual item tag 112, or may determine the reorder device ID 120 from the reorder device 102 such that the item 110 may be associated with the reorder device 102.

The item tag reader(s) 306 may also include a component that is configured to detect or read a chip, such as a chip that is typically included on a credit card. The item tag reader(s) 306 may include one or more physical contacts that detect the chip when the chip is placed on, adjacent to, and/or within the physical contact(s). Moreover, and as stated above, the association between the item 110 and the reorder device 102 may be based on data/information input by a customer 108, such as via a mobile application or website that is accessible using a customer device associated with the customer 108.

In certain embodiments, the item tags 112 may have an inner layer, such as a film pressure sensor or a force sensitive resistor (FSR) sensor. The FSR sensor may be printed using one or more carbon inks on a type of thermoplastic polymer resin, such as polyethylene terephthalate (PET). Such an inner layer structure may allow the item tags 112 to determine or sense the weight/mass of items 110 (or containers 208 that contain items 110) placed thereon. The item tags 112 may be placed on, or adhered/affixed to (permanent or detachably), at least a portion of the top surface 202 of the reorder device 102. In some instances, multiple item tags 112 may be placed on the top surface 202 of the same reorder device 102. The reorder device 102 may have an NFC-compatible antenna 316 and one or more protocols that allow for wireless power transmission to the item tag(s) 112, such that the item tag(s) 112 may be powered in a wireless manner. Various types of data may also be wirelessly transmitted as a result of the NFC-compatible antenna 316. As a result, the reorder device 102 may determine/detect the item tag ID(s) 122 of the item tag(s) 112, as well as the weight/mass of the item(s) 110 (or container(s) 208 that contain the item(s) 110) that are currently placed on/over one of the item tags 112. In some embodiments, the size of the reorder device 102 may be standardized, and the entity 106 may allow third party entities to print their own item tags 112 and associate their items 110/products with the item tags 112 and/or the reorder device(s) 102. The item tag(s) 112 may be shipped/provided to customers 108 (1) separately, (2) with an item 110 to be re-used (e.g., the item tag 112 is bundled with the item 110/product), and/or (3) with an item 110, where the item tag 112 may then be discarded/disposed of with the item 110 (e.g., the item tag 112 may be adhered to a surface of the item 110/container 208).

In alternative embodiments, the reorder device 102 itself may not have a power source 304 and the reorder device 102 may not have WiFi connectivity. Instead, the power source(s) 304 and the components that allow for WiFi connectivity are located remotely from the reorder device 102, such as at a central device/source/hub that is configured to power the reorder device 102 and that allows for communications between the reorder device 102, the entity device(s) 104, and/or the customer device(s) of customer 108. Such a configuration would allow for "smart" shelves or counters. In this scenario, the shelves/counters may constitute the reorder device 102 and pressure-sensitive pads/mats may be placed on, or incorporated within, the shelves/counters. Different items 110 may then be placed on different ones of the pressure-sensitive pads/mats. Since the reorder device 102 would not include a power source 304 and communication components, the reorder device 102/pads/mats could be manufactured at a lower cost and may allow for items 110 of different sizes to be placed thereon. For instance, bulkier/larger items 110 (e.g., toilet paper) could be placed on a first shelf/counter of the reorder device 102, a first portion of the first shelf/counter and/or a first pad/mat, and less bulky/smaller items 110 may be placed on a second, different shelf/counter of the reorder device 102, a second, different portion of the first shelf/counter, and/or a second, different pad/mat. Moreover, the shelves/counters/reorder device 102 (e.g., the shelves/counters, or the surfaces thereof) may be branded/labeled for specific items 110. Since the central hub device would be the device with communication components (configured to send information/data via WiFi), additional mats/pads placed on the device would require little to no further setup or configuration. The mats/pads placed on the shelves/counters of the reorder device 102 may be disposable and may possibly be adhered to the bottom surface of boxes or other containers that are used to ship/transport the items 110, as opposed to the mats/pads being placed on (or adhered or affixed to) the top surfaces of the shelves/counters.

As stated above, in some embodiments, the antenna(s) 316 that powers and facilitates communications with the pad/mat is positioned directly under the pad/mat. However, in other embodiments, the antenna(s) 316 may not be positioned directly beneath/under the pad/mat, and may instead be located remotely from the pad/mat. For instance, the antenna(s) 316 may be a lightbulb that that is within a storage room, closet, pantry, etc., in which the pad/mat/reorder device 102 is located. The light bulb may radiate a source of radio frequency (RF) energy (e.g., 900 MHZ UHF RFID) that provides both power and a communication channel to other devices in proximity to, and within range of, the lightbulb. Such a configuration may allow little to no setup of the reorder device 102 and the pad/mat/reorder device 102 need not be located in a particular location, provided that the pad/mat/reorder device 102 is within range of the RFID signal associated with the lightbulb.

The reorder device 102 may include one or more sensors 308, such as a weight sensor 308 that is configured to determine/obtain weight measurements associated with the item(s) 110 that are placed on the top surface 202 of the reorder device 102. The weight sensor(s) 308 may be located on, or directly underneath, the top surface 202 of the reorder device 102 such that the weight sensor(s) 308 may determine a weight of the items 110 that are placed on the top surface 202 of the reorder device 102. Furthermore, the weight sensor(s) 308 may include one or more load cells, such as hydraulic load cells, pneumatic load cells, strain gauge load cells, and/or piezoelectric load cells. In other embodiments, the amount of the item 110 remaining on the top surface 202 of the reorder device 102 may be determined using one or more Time of Flight (ToF) sensors and/or infrared sensors. Moreover, the sensor(s) 308 may include one or more pressure sensors 308, which may include microelectromechanical systems (MEMS) pressure sensors 308, that are configured to detect whether items 110 are currently situated on the top surface 202 of the reorder device 102 and/or to detect an amount (e.g., weight, volume, number/quantity, etc.) of the items 110. The weight sensor(s) 308 may periodically obtain weight data regarding the items 110 at predetermined intervals, such as every day, every 12 hours, every 6 hours, every hour, every 15 minutes, and so on. In some embodiments, the sensor(s) 308 may determine/sense when an item 110 is placed on the top surface 202 of the reorder device 102, which may cause the reorder device 102 to obtain weight measurements of the item(s) 110. The weight sensor(s) 308 may also obtain weight measurements at the direction of the entity 106, such as by the entity device(s) 104 sending a signal to the reorder device 102. The frequency of weight measurements performed by the weight sensor(s) 308 may be adjusted over time, which may be based on the rate of consumption of the items 110 by the customer 108 and/or the manner in which the reorder device 102 is being powered. For instance, if the reorder device 102 is being powered via a power cord and power outlet, the weight measurements may be obtained more frequently (e.g., every hour, every 15 minutes, etc.). However, if the reorder device 102 is being powered using a battery, the weight measurements may be taken less frequently to conserve battery life (e.g., once per day). The sensor(s) 308 may receive power from the power source 304 and may operate under control of one or more logic controllers 310.

As stated above, the reorder device 102 and/or the entity 106 may determine the frequency in which the sensor(s) 308 obtain measurements with respect to the item(s) 110. Provided that the reorder device 102 is powered using one or more batteries, the frequency of the measurements (e.g., a measurement interval) may be determined in order to optimize the battery life of the batteries. If the sensor(s) 308 obtain item measurements less frequently (e.g., half as often), the battery/batteries may supply power for a longer period of time (e.g., twice as long). In some embodiments, the frequency of measurements may be based on the current amount of the item 110 situated on the reorder device 102. For instance, if it is determined that 90% of the item 110 is remaining, measurements may be taken less frequently since there is a lower likelihood that the currently supply of the item 110 will be depleted in a short period of time. However, if it is determined that the amount remaining of the item 110 is at 20%, the item measurements may be taken more frequently (e.g., every 15 minutes, hourly, etc.) in order to avoid the supply of the item 110 being depleted. The frequency of item measurements may also be time dependent. Provided that the reorder device 102 is located in a business setting, measurements may be taken more frequently during business hours (e.g., 8 am-5 pm) when items 110 are likely to be used/consumed and less frequently during evenings (e.g., after 5 pm) and weekends (e.g., Saturday and Sunday) when employee are not likely to be present. However, in the household context, the measurements may be taken more frequently when individuals are likely to be home (e.g., evenings, weekends, during the day for stay-at-home parents or individuals that work from home, etc.), and less frequently when individuals are not likely to be consuming/using the items 110 (e.g., at night while individuals are likely sleeping, during the day for individuals that work outside the home, etc.). In additional embodiments, it may be determined that certain items 110 (e.g., hospital medical supplies) may have a higher turnover as compared to other items 110. The sensor(s) 308 (e.g., a weight sensor or scale) may be placed in a lower power state such that the sensor(s) 308 are configured to sense or determine a change in a status of the sensor(s) 308.

In other embodiments, the frequency in which measurements are taken/obtained by the sensor(s) 308 may be based on information/data relating to the customer 108, which may include the rate at which the customer 108 has previously used/consumed the item 110 and/or different items 110. The customer information/data may indicate a likelihood/probability that the items 110 situated on the reorder device 102 will not fall below the item reorder threshold for that customer 108/item 110 in a particular time period. The time intervals in which measurements are taken/obtained, including the time duration between measurements, may be determined by the reorder device 102, or may be determined by the entity 106 and transmitted to the reorder device 102. In alternative embodiments, the frequency of measurements may be adjustable by the customer 108, or may be obfuscated or hidden to the customer 108. In some embodiments, the customer 108 may be able to choose between different shipping/delivery speeds for different reorder devices 102/items 110 (e.g., 1-day shipping/delivery, 2-day shipping/delivery, standard U.S. mail, etc.). If the customer 108 chose a slower shipping/delivery speed for a particular item 110, the frequency of measurements for that reorder device 102/item 110 may be lower (e.g., once per day).

The sensor(s) 308 may also include one or more image capture devices, such as one or more cameras or video cameras. The camera(s) may capture image data (e.g., still images) and/or video data (e.g., video) that depicts the reorder device 102, including the items 110 currently situated on the top surface 202 of the reorder device 102. The reorder device 202 and/or the entity device(s) 104/entity 106 may analyze the image/video data to determine an identity of the items 110 (e.g., toilet paper, cereal, etc.) and/or to determine an amount of the item 110 currently situated on the reorder device 102. The amount of the item 110 remaining may be a current volume of the items 110 located on the reorder device 102 and/or a number/quantity of the items 110. The reorder device 102 and/or the entity device(s) 104/entity 106 may use one or more computer vision techniques/algorithms to determine the identity of the item 110 and/or the current amount of the item 110. Such computer vision techniques/algorithms may include object detection/classification, shape recognition technology, optical character recognition (OCR), motion detection, 2D code reading, pose estimation, color detection, and so on.

The camera(s) that capture the image/video data that depicts the reorder device 102 and the items 110 situated thereon may be located in different locations. For instance, the camera(s) may be incorporated or integrated within the reorder device 102 itself. For instance, the camera(s) may be positioned such that a side or top view of the items 110 situated on the reorder device 102 may be captured. The camera(s) may be coupled to the housing 302 of the reorder device 102 using some type of structure or support mechanism. The camera(s) may also be incorporated in a shelving unit that includes one or more shelves in which the reorder device(s) 102 are placed upon. For example, provided that a reorder device 102 is placed on a particular shelf/surface, the camera(s) may be positioned above the reorder device 102, such as by being affixed to the bottom surface of a higher shelf. That way, the camera(s) may capture image/video data that depicts a top view of the reorder device 102 and the items 110 situated thereon. The camera(s) may also be affixed to a support mechanism of the shelving unit such that a side view of the reorder device 102/items 110 may be captured. In other embodiments, the camera(s) may be positioned in a location that is remote from the reorder device 102. For instance, the camera(s) may be placed on a wall, ceiling, door, cabinet, structure, etc., such that one or more reorder devices 102 may be depicted in the image/video data captured by the camera(s). Upon the camera(s) capturing the image/video data, one or more computing devices communicatively coupled to the camera(s) may transmit the image/video data to the reorder device 102 and/or the entity device(s) 104 for analysis.

The logic controller(s) 310 may include a microprocessor and/or other logic to control the item tag reader(s) 306 and/or the sensor(s) 308 and to possibly cause transmission of a signal to initiate a reorder of the item 110, as discussed herein. In some embodiments, the logic controller(s) 310 may be formed as a single circuit board that includes at least some of the components discussed herein, such as at least one of memory 314, one or more timer(s) 312, one or more antenna(s) 316, one or more communication interface(s) 318, and/or one or more data input/output components 320. At least some of the components may be connected to or coupled to the logic controller(s) 310, and thereby configured to interface with the logic controller(s) 310 and/or other components as discussed herein. In some embodiments, the logic controller(s) 310 may include one or more processors that may execute one or more modules to cause the reorder device 102 to perform a variety of functions, as set forth above and explained in further detail in the following disclosure. In some embodiments, the processor(s) may include a central processing unit (CPU), a graphics processing unit (GPU), both CPU and GPU, or other processing units or components known in the art. Additionally, each of the processor(s) may possess its own local memory, which also may store program modules, program data, and/or one or more operating systems.

The timer(s) 312 may track time and may include a clock. In some embodiments, the timer(s) 312 may output time data, such as a timestamp 126, for storage in the memory 314. The timestamp 126 may correspond to a particular time at which a weight measurement, a volume measurement, a pressure measurement, and/or image/video data was obtained by the sensor(s) 308.

The memory 314 may store various data, modules, and/or other information. The memory 314 may include a non-transitory machine-readable storage medium having stored thereon instructions (in compressed or uncompressed form) that may be used to program the logic controller(s) 310 (or other electronic device) to perform processes or methods described herein. The machine-readable storage medium may include, but is not limited to, flash memory, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through networks.

In some embodiments, the memory 314 may store a reorder device identifier 120 (also referred to herein as "reorder device ID 120"). The reorder device ID 120 may uniquely identify the reorder device 102, and may include alphanumeric information that identifies the reorder device 102. For instance, the reorder device ID 120 may be a serial number of the reorder device 102, an identifier assigned by the entity 106, such as a product/item identifier, an Internet Protocol (IP) address, or any other information that identifies that particular reorder device 102. The reorder device ID 120 may also include information that identifies the customer 108 and a location at which the reorder device 102 is located (e.g., a residence, a workplace, etc.). The reorder device ID 120 may be stored by the entity device(s) 104 associated with the entity 106.

The memory 314 may also include an item tag detection module 322, which may cause the item tag reader(s) 306 to detect one or more item tags 112 that are in proximity to, or are within a threshold distance from, the item tag reader(s) 306. Upon the item tag reader(s) 306 detecting a particular item tag 112, the reorder device 102 may store an item tag ID 122 (also referred to herein as "item tag identifier 122") that is associated with the item tag 112. The item tag ID 122 may identify the item tag 112, and may also identify the item 110 associated with the item tag 112. For instance, the item tag ID 122 may identify, or include alphanumeric information that represents, a name of the item 110, a manufacturer/provider of the item 110, a brand of the item 110, a size/style/color of the item 110, a weight of the item 110, and/or other attributes of the item 110.

An item measurement module 324 may cause the sensor(s) 308 to capture weight measurements for the items 110 that are include on the top surface 202 of the reorder device 102 at one or more intervals. Provided that the items 110 are included within a container 208 that is placed on the top surface 202 of the reorder device 102, the sensor(s) 308 may first obtain a weight measurement that indicates a weight of the container 208. The weight of the container 208 may be subsequently considered, or disregarded, when determining the current weight of the items 110 that are on the reorder device 102. The memory 314 may store item weight data 124 that represents the measured weight of the items 110 at different times.

A time determination module 326 may cause the timer(s) 312 to determine a time at which each weight measurement is obtained. The particular time (e.g., a timestamp 126) may be referred to herein as timestamp data 126, and each timestamp 126 may be stored in association with the weight measurement the timestamp 126 corresponds to. As a result, for each weight measurement of the items 110, the reorder device 102 may be aware of the time at which the weight measurement was obtained.

A data communication module 328 stored in the memory 314 may cause the reorder device ID 120, the item tag ID 122, the item weight data 124, and/or the timestamp data 126 to be transmitted to a network device and/or the entity device(s) 104. The data may be communicated in any manner, such as via Bluetooth (Bluetooth Low Energy (BLE) may also be considered when using the term "Bluetooth"), WiFi, a cellular connection (e.g., 3G, 4G, LTE, etc.), and so on.

The memory 314 may store other modules, which may also be used to perform the operations/processes described herein. For example, a power management module may provide indications of a low battery. An input module may receive input from the customer 108 via one or more microphones, a display, one or more buttons, etc. An output module may output information to the customer 108 via one or more speakers, a display, one or more lights, etc. In some embodiments, one of the other modules may limit an amount of orders/reorders for an item 110 to within a limit for a given timeframe. For example, a reorder of a certain item 110, such as dog food, may be limited to an order of one bag a month, which may be triggered in response to a signal from the sensor(s) 308. Generation of a second reorder signal may cause the limit to be exceeded, and may prevent an additional order over the limit. This logic may be implemented on the reorder device 102, the network device, and/or the entity device(s) 104.

The antenna(s) 316 may be used to transmit a wireless signal generated via one or more of the communication interface(s) 318. The antenna(s) 316 may be integrated into a printed circuit board (PCB), where a chip associated with the item tag reader 306 resides. The communication interfaces 318 may facilitate communications using wireless protocols, such as Bluetooth, WiFi, and/or other known or widely used communication protocols to transmit information to the network device, a device of the customer 108, and/or the entity device(s) 104. In some embodiments, the one or more communication interfaces 318 may support at least a wireless connection to various networks, such as a WiFi network. Further, in some cases, the one or more communication interfaces 318 may support both wired and wireless connections to various networks, such as cellular networks, radio, WiFi networks, short-range or near-field networks (e.g., Bluetooth), infrared signals, local area networks, wide area networks, the Internet, and so forth. Accordingly, the reorder device 102 may be configured to transmit the raw data stored in the memory 314 to the network device, a customer device, and/or the entity device(s) 104. In other embodiments, the reorder device 102 may be configured to process the data in order to facilitate the automatic reordering of the item 110 on behalf of the customer 108, as will be described in additional detail with respect to FIG. 4.

In some embodiments, the reorder device 102 may include one or more data input/output components 320. For instance, the data input/output components 320 may include input components that allow the customer 108 to power on the reorder device 102 (e.g., one or more buttons) and/or to input/provide information to the reorder device 102 (e.g., one or more microphones, one or more displays/graphical user interfaces, one or more touch-sensitive displays, one or more buttons, etc.). The one or more microphones may capture audio data representing voice commands audibly uttered by the customer 108 (e.g., power on/off, capture weight measurement, etc.). The reorder device 102 may transmit the raw audio data to the entity device(s) 104 and/or the microphone(s) may generate one or more audio signals that represent the audio data, which may then be transmitted to the entity device(s) 104. The reorder device 102 and/or the entity device(s) 104 may process the audio signal(s) using automated speech recognition (ASR) and/or natural language processing (NLP) in order to identify words/phrases included in the voice command(s).

The data input/output components 320 may also include components that output information to the customer 108, such as one or more displays (e.g., graphical user interfaces, touch-sensitive displays, etc.), one or more lights, one or more LEDs, one or more LCDs or other screens to provide information to a user of the reorder device 102, one or more speakers to audibly output information to the customer 108, and so on. For example, the display(s) may be implemented as a single LED that indicates, when activated, that a battery is low to prompt replacement of the battery. The display may include an LED that indicates, when activated, that a reorder request was issued. Other information may also be provided by the display(s) to enable customer interaction with the reorder device 102. The speaker(s) of the reorder device 102 may audibly output information that is responsive to the voice commands previously output by the customer 108 (e.g., the item 110 has been reordered, the battery is low, etc.).

In order to initiate a reorder of the item 110, the reorder device 102 may transmit a signal to the network device, such as a WiFi hub, a smartphone, or other network device. The signal may also be transmitted directly to the entity device(s) 104. The signal may include the reorder device ID 120, the item tag ID 122, the item weight data 124, and/or the timestamp data 126. The network device may then transmit the signal or another signal to the entity device(s) 104 to request a resupply of the item 110. The entity 106 may process the transmitted data to initiate the resupply of the item 110.

Although WiFi may be used to transmit the reorder device ID 120, the item tag ID 122, the item weight data 124, and/or the timestamp data 126 from the reorder device 102 to the network device and/or the entity device(s) 104, the customer 108 may be in a location in which WiFi is limited, inconsistent, or unavailable. In that scenario, Bluetooth or a cellular connection may be used to transmit the data to the network device and/or the entity device(s) 104. In some embodiments, the data may be transmitted by the reorder device 102 to a device (e.g., a cellular telephone, a tablet device, etc.) of the customer 108, such as via a mobile application associated with the entity 106. The customer device/mobile application may receive the data from the reorder device 102 via NFC, WiFi, Bluetooth, etc., and the customer device may then send the data to the entity device(s) 104. Moreover, in other embodiments, multiple reorder devices 102 may be coupled/connected to a hub/central device via Bluetooth, WiFi, etc. The hub/central device may receive the data from the reorder devices 102 and then send the data to the entity device(s) 104.

Figure 4:
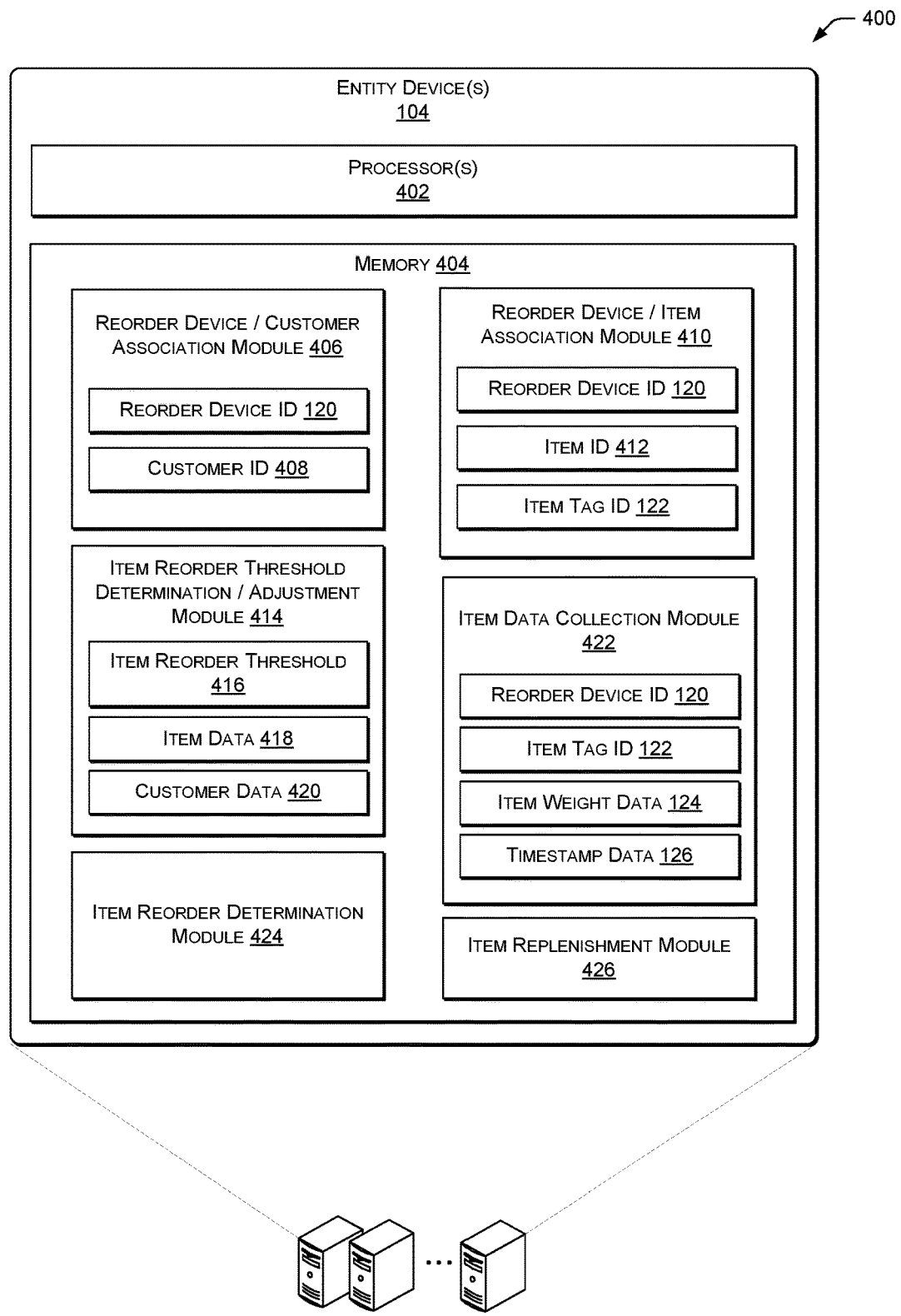
FIG. 4 is a block diagram of components of an entity device that facilitates the reordering of an item for a customer based on data received from a reorder device associated with the customer.

FIG. 4 illustrates a block diagram showing an illustrative computing architecture of one or more entity devices that are associated with an entity that facilitates the automatic reordering of items for a customer. The entity device(s) 104 may include one or more processor(s) 402 and memory 404, which stores one or more modules. The processor(s) 402 may execute the one or more modules and/or processes to cause the entity device(s) 104 to perform a variety of functions, as explained in detail in the present disclosure. In some embodiments, the processor(s) 402 may include a central processing unit (CPU), a graphics processing unit (GPU), both CPU and GPU, or other processing units or components known in the art. Additionally, each of the processor(s) 402 may possess its own local memory, which also may store program modules, program data, and/or one or more operating systems.

The memory 404 may include volatile memory (such as RAM), non-volatile memory (such as ROM, flash memory, miniature hard drive, memory card, or the like), or some combination thereof. The memory 404 may include non-transitory computer-readable media and the memory 404 may include, or be associated with, the one or more modules. In some embodiments, the one or more modules may include or be associated with computer-executable instructions that are stored by the memory 404 and that are executable by the processor(s) 402 to perform such operations. The entity device(s) 104 may also include additional components not listed above that may perform any function associated with the entity device(s) 104.

As previously stated herein, the entity 106 may provide a service that enables the automatic reordering of items 110 for a customer 108, without requiring customer input with respect to the reorder. Provided that the customer 108 agrees to participate in the service, such as via a website or mobile application associated with the entity 106, the customer 108 may receive/obtain a reorder device 102. Provided that the entity 106 provides the reorder device 102 to the customer 108, a reorder device/customer association module 406 may associate a reorder device ID 120 of the reorder device 102 with the customer 108, such as via a customer ID 408 and/or a customer profile/account of the customer 108. If the reorder device 102 is obtained by a different source, the customer 108 may provide the reorder device ID 120 to the entity 106, or the reorder device/customer association module 406 may generate a reorder device ID 120 for the reorder device 102 based on other information provided by the customer 108. In either scenario, the entity 106 may be aware of which reorder device 102 is possessed by the customer 108, and the reorder device/customer association module 406 may associate, in a database or data structure, the reorder device 102 and the customer 108 with one another. For the purpose of this discussion, a reorder device 102 may be associated with a single item 110/product, so a customer 108 may possess multiple reorder devices 102, with each reorder device 102 being associated with a different item 110/product.

Moreover, a reorder device/item association module 410 may associate the reorder device 102 with the item 110 that is placed on the reorder device 102. As discussed herein, provided that a customer 108 indicates an agreement to participate in the automatic reordering service with respect to a specific item 110, the entity 106 may provide an item tag 112 associated with that item 110 to the customer 108. In order to initiate automatic reordering of that item 110, the customer 108 may place the item 110, or a container 208 that contains/holds the item 110, on the top surface 202 of the reorder device 102. The customer 108 may also affix/place, either detachably or permanently, the item tag 112 to the reorder device 102, the item 110 itself, or the container 208. Upon the item tag 112 coming within proximity of, or within a threshold distance from, the item tag reader 306 of the reorder device 102, the item tag reader 306 may detect the item tag 112. The reorder device 102 may then transmit, possibly via a network device, its reorder device ID 120 and an item tag ID 122 to the entity device(s) 104. Since the item tag 112 was previously associated with the item 110, the item 112 and/or an item ID 412 associated with the item 112 may be associated with the reorder device 102. As a result, the entity 106 may be aware that a particular item 110 has been placed on the reorder device 102 and that the sensor(s) 308 of the reorder device 102 will subsequently obtain data relating to the item 110.

In various embodiments, an item reorder threshold determination/adjustment module 414 may determine an item reorder threshold 416 for a particular item 110 and with respect to a particular customer 108. Although the item reorder threshold 416 may be configurable/adjusted by the customer 108, the reorder device 102 and/or the entity 106 may determine/adjust the item reorder threshold 416. As discussed herein, the entity 106 may receive, from the reorder device 102 and/or a network device, item weight data 124 that indicates the current weight of the item 110 that is currently situated on the reorder device 102. When the item(s) 110 are initially placed on the reorder device 102, the sensor(s) 308 of the reorder device 102 may capture an initial weight measurement of the item(s) 110. Over time, the reorder device 102 may continue to capture weight measurements of the item(s) 110 and decreasing weight measurements may indicate that the amount remaining of the item 110 (e.g., a current supply of the item 110) is decreasing. The entity 106 may want to reorder additional inventory of the item 110 that will be delivered to the customer 108 prior to the current supply of the item 110 is depleted (e.g., the item 110 runs out). The item reorder threshold 416 may correspond to a remaining amount of the item 110 at which a reorder of the item 110 is triggered. Accordingly, the item order threshold 416 may correspond to a particular weight (e.g., 1 pound, 8 ounces, etc.) or a percentage remaining of the item 110 with respect to weight/mass (e.g., 30%, 20%, etc.), a particular volume or a percentage remaining of the item 110 with respect to volume, and/or a number/quantity of the item 110 or a percentage remaining of the item 110 with respect to the number/quantity of the item 110. The percentage remaining of the item 110 may be based on a known weight of the item 110 (e.g., the weight of a package of the item 110) or a previous weight measurement received by the reorder device 102, possibly at a time at which the item 110 was placed on the reorder device 102 (or shortly afterwards).

The item reorder threshold 416 may be different for different items 110 and different for different customers 108, potentially based on the extent to which the item 110 is consumed/used, and/or the rate at which the item 110 is consumed/used. The item reorder threshold 416 for a particular item 110 may initially be a default value (e.g., 30%, 20%, etc.) and may be subsequently adjusted. In certain embodiments, the item reorder threshold 416 may be determined and/or adjusted based on item data 418. The item data 418 may include the type of the item 110. For instance, items 110 that tend to be consumed/used more quickly (e.g., printer paper, dog food, etc.) may have a greater item reorder threshold 416 (e.g., 30%) so that the customer's 108 supply of the item 110 will not be depleted prior to receiving additional inventory of the item 110. On the other hand, items 110 that tend to be consumed/used less quickly (e.g., facial tissue, staplers, etc.) may have a lower item reorder threshold 416 (e.g., 10%). For instance, once the amount of those items 110 decreases to 10%, there is still likely adequate time for the entity 106 to reorder additional inventory of the item 110 for the customer 108.

The item reorder threshold 416 may also be based on the packaging of the item 110. Certain items 110 may be packaged in bulk, such as toilet paper, pens, garbage bags, and so on. Such items 110 may have a lower item reorder threshold 416 because, once the customer's 108 supply is equal to or less than the item reorder threshold 416, the customer 108 may still have an adequate supply of the item 110. On the other hand, if an item 110 is packaged in a small number, the item order threshold 416 for that item 110 may be higher. For instance, if printer cartridges are delivered in package of two, once a first printer cartridge is used, there is only one remaining and a large print job may deplete the supply of that item 110. Moreover, the size of the items 110 as shipped may also be considered. Larger, bulkier items 110 (e.g., toilet paper) may have a lower item reorder threshold 416 since such items 110 are likely more difficult to store for the customer 108 if additional inventory of the item 110 is received before the customer's 108 current supply is depleted. Smaller items 110, such as pens or pencils, may be more easily stored by the customer 108 due to decreased storage demands. In other embodiments, whether or not an item 110 is perishable or not (e.g., food items 110) may be considered when determining the item reorder threshold 416 for a particular item 110.

In certain embodiments, the item reorder threshold 416 may be determined and/or modified based on customer data 420. The customer data 420 may correspond to historical data indicating the extent to which and/or the rate at which the particular item 110 has been used/consumed by customers 108. For instance, if historical data indicates that the item 110 is typically used/consumed at a more rapid rate, indicating that supply of the item 110 typically is depleted at a faster rate, the item reorder threshold determination/adjustment module 414 may determine that the item reorder threshold 416 should be higher (e.g., 30-40%). On the contrary, if the historical data indicates that the item 110 is typically used/consumed at a slower rate, indicating that supply of the item 110 typically is depleted at a slower rate, the item reorder threshold determination/adjustment module 414 may determine that the item reorder threshold 416 should be lower (e.g., 10-20%).

The customer data 420 may also correspond to, and be based on, the customer 108 associated with the reorder device 102. For instance, the item reorder threshold 416 may be based on the extent to which and/or the rate at which the customer 108 has previously consumed/used the item 110 associated with the reorder device 102 and/or different items 110. If it is determined that the customer 108 is using/consuming the item 110 at a faster/slower rate, the item reorder threshold 416 may be increased/decreased. In some embodiments, the determination and adjustment of the item reorder threshold 416 for different items 110 may be based on one or more predictive models and/or one or more machine learning algorithms/techniques. The predictive models may include a group method of data handling, Naïve Bayes, k-nearest neighbor algorithm, majority classifier, support vector machines, random forests, boosted trees, Classification and Regression Trees (CART), neural networks, ordinary least square, regression analysis, and so on. Moreover, the one or more machine learning algorithms/techniques may include supervised learning, unsupervised learning, semi-supervised learning, classification analysis, regression analysis, clustering, recognition, etc. Moreover, any other types of algorithms or classifiers may also be used. The predictive model/machine learning techniques may determine the appropriate item reorder threshold 416 for a particular item 110 based on initial item reorder thresholds 416, whether or not a current inventory of the item 110 was depleted for a customer 108 prior to the customer 108 receiving additional inventory of the item 110, whether or not the customer 108 receive an excess of additional items 110 that needed to be stored by the customer 108, feedback from customers 108, the rate at which the item 110 was previously consumed/used by the customer 108 and/or different customers 108, and so on.

Accordingly, the item reorder threshold 416 may be based on a particular item 110, a customer's 108 previous use of the item 110 (e.g., the extent of use/consumption, a rate of use/consumption, a duration of use/consumption, etc.), the customer's 108 use of other items 110, and/or use/consumption of the item 110 by other customers 108. The item reorder threshold 416 may also be determined/adjusted based on seasonality, since some items 110 may be used/consumed at different rates at different times of the year. For instance, a particular item 110 may be used at a faster/slower rate during a particular month (e.g., January), season (e.g., summer), holiday (e.g., Christmas), etc., and such information may be determined using the machine learning techniques/algorithms and/or the predictive models described herein. The item reorder threshold 416 may also be determined/adjusted based on other factors, such as likely traffic conditions, information about the location/building in which the reordered items 110 are to be delivered, times/days in which the location/building is accessible for delivery of the reordered items 110, the likely mode of delivery (e.g., truck, airplane, car, bicycle, unmanned aerial vehicle (UAV), etc.) of the reordered items 110, and so on.

As discussed herein, the reorder device 102 may send, and an item data collection module 422 of the entity device(s) 104 may receive/obtain, the reorder device ID 120, the item tag ID 122, the item weight data 124, and/or the timestamp data 126. Based on this data, the entity 106 may determine the weight of the item(s) 110 that are currently situated on the top surface 202 of the reorder device 102 at a particular time. For instance, the entity 106 may determine that the weight of the item(s) 110 was a first weight at a first time, a second weight at a second time that is subsequent to the first time, a third weight at a third time that is subsequent to the second time, and so on. As a result, the entity 106 may determine if the weight of the item(s) 110 is remaining the same, or whether the weight is decreasing over time. Provided that the weight of the item(s) 110 is decreasing over time, the entity 106 may conclude that the current inventory of the item 110 at the location of the customer 108 is decreasing, and is possibly being depleted. As a result, the entity 106 may determine that additional inventory of the item 110 should be automatically ordered for the customer 108 so that the customer's 108 inventory is replenished before the current inventory is depleted, which may cause an inconvenience for the customer 108 and result in a poor customer experience.

In various embodiments, the item reorder determination module 424 may determine a time at which to reorder an item 110 for the customer 108. In particular, the item reorder determination module 424 may determine whether the current weight of the item 110 situated on the reorder device 102 is equal to or less than the item reorder threshold 416 that was previously determined for the item 110. If so, the entity 106 may trigger the reorder of the item 110 for the customer 108. If the entity 106 provides/offers the item 110, the entity 106 may deliver the item 110 to the location of the customer 108, possibly using a third party deliverer. However, if the item 110 is offered by a third party merchant, the entity 106 may cause the merchant to prepare/provide the item 110 to the customer 108, such as by sending a notification to a merchant device instructing the merchant to facilitate the reorder and delivery of the item 110 to the customer 108. Based on the item reorder threshold 416 for the item 110, the item data 418, and/or the customer data 420, as discussed above, the entity 106 may determine/predict when consumption/use of the remaining inventory of the item 110 will be depleted, and then ensure that delivery of additional inventory of the item 110 will occur prior to the time of anticipated depletion. At the same time, the entity 106 may desire to ensure that an excessive amount of the item 110 is not reordered for the customer 108, which may cause the customer 108 to store the item 110 for later use. The entity 106 may consider the time associated with placing the reorder for the item 110, preparing/providing the item 110 (by the entity 106 and/or a third party merchant), and/or delivery of the item 110 to the location associated with the customer 108. As a result, the customer 108 is likely to receive additional inventory of the item 110 prior to the current inventory of the item 110 being depleted, without having to perform an action to facilitate the reorder of the item 110.

In certain embodiments, the entity 106 may facilitate the reorder of the item 110 based on an initial weight of the items 110. The initial weight of the items 110 may be a known weight of the items 110 as they are packaged and delivered to the customer 108. The initial weight of the items 110 may correspond to a weight measurement of the items 110 when the items 110 are placed on the reorder device 102, or shortly after the items 110 are placed on the reorder device 102. That is, the customer 108 may use a tare function that resets a weight sensor/scale (that measures the weight of the item(s) 110) to zero before the scale measures the weight of the items 110. For instance, the customer 108 may place the item tag 112 and/or the container 208 on the top surface 202 of the reorder device 102, initiate the tare function, and place the item(s) 110 on the reorder device 102 so that the weight/mass of the item tag 112/container 208 are not considered when the weight measurements of the items 110 are obtained. The item reorder threshold 416 may correspond to a particular weight that is less than the initial weight, which may be a percentage of the initial weight (e.g., 30%, 20%, etc.). The reorder device 102 may take weight measurements of the item 110 over time to determine whether the customer 108 is consuming/using the item 110, and to determine whether a current inventory of the item 110 with respect to the customer 108 is decreasing or being depleted. Decreasing weight measurements may indicate that the item 110 is being used/consumed by the customer 108. When the item weight data 124 obtained and sent by the reorder device 102 becomes equal to or less than the item reorder threshold 416 for that item 110/customer 108, the entity 106 may cause the reorder of additional inventory of the item 110 for the customer 108. For instance, the entity 106 may determine that the current weight of the item 110 is equal to or less than a certain amount/weight (e.g., 8 ounces), or that the current weight of the item 110 is equal to or less than a certain percentage of the initial weight of the item 110 (e.g., 20%, 30%, etc.). If the item reorder threshold 416 has not been reached, the entity 106 may refrain from reordering additional inventory of the item 110 and may continue to receive weight measurements for the item 110 until the item reorder threshold 416 has been reached or exceeded.

Upon determining that the weight measurement of the item 110 meets or exceeds the item reorder threshold 416, an item replenishment module 426 may cause additional inventory of the item 110 to be reordered/ordered and delivered to the customer 108. As stated herein, the additional inventory of the item 110 may be provided by the entity 106 and/or by a third party merchant. In some instances, the entity 106 may offer the item 110 via a website and/or mobile application associated with the entity 106 on behalf of the third party merchant. As a result, without customer interaction with respect to reordering the item 110, the customer 108 is likely to receive additional inventory of the item 110 before a current supply of the item 110 is depleted/runs out.

In some embodiments, regardless of whether the item reorder threshold 416 with respect to an item 110/customer 108 has been satisfied, the entity 106 may refrain from ordering additional inventory of the item 110 for the customer 108. For instance, provided that the customer 108 has subscribed to receiving a particular item 110 on a periodic basis from the entity 106 or a different merchant (e.g., a box of diapers is sent monthly), the amount remaining of the item 110 may cause the entity 106 to refrain from ordering/sending additional inventory of the item 110 to the customer 108. The entity 106 may determine that no additional inventory of the item 110 is needed by the customer 108 based on his/her current supply of the item 110. Based on the current amount of the item 110, the entity 106 may also elect to send a lesser amount of the item 110, or possibly send a greater amount of the item 110 as compared to the amount that is typically sent.

In an illustrative example, assume that the item 110 placed on the top surface 202 of the reorder device 102 by a customer 108 is toilet paper, as illustrated in FIG. 2. The toilet paper may be placed directly on the top surface 202 of the reorder device 102, or may be placed within or on a container 208 that is placed on the top surface 202 of the reorder device 102. The entity 106 may be aware that the package of toilet paper has an initial weight of one pound (16 ounces). Provided that the initial weight of the toilet paper is unknown, the sensor(s) 308 of the reorder device 102 may determine the weight of the toilet paper when the customer 108 places the toilet paper on the top surface 202 of the reorder device 102. It may also be determined that the item reorder threshold 416 of the toilet paper is 25%, or 4 ounces (25% of 16 ounces=4 ounces). The item reorder threshold 416 may be based on the type of the item 110, the rate at which (or the extent to which) the toilet paper has been used/consumed by other customers 108, the rate at which (or the extent to which) the toilet paper (or one or other items 110) has been used/consumed by the customer 108, a size of a package of the toilet paper, the number of toilet paper rolls within a package, a perishability of the toilet paper (e.g., not perishable), and so on. At different intervals, the reorder device 102 may periodically collect/obtain weight measurements of the toilet paper as the customer 108 uses the toilet paper over time. The entity 106 may determine whether the weight measurements are equal to or less than the item reorder threshold 416 (e.g., 25% or 4 ounces). When it is determined that the weight measurement of the toilet paper is 4 ounces or less, the entity 106 may determine that the item reorder threshold 416 has been satisfied. The entity 106 may then trigger a reorder of the toilet paper for the customer 108, without the customer 108 having to reorder the toilet paper himself/herself. In some embodiments, the entity 106 may send a notification (e.g., an e-mail, text message, etc.) to the customer 108 indicating that the toilet paper has been ordered and that the customer 108 will be charged for the toilet paper. As a result, the customer 108 may receive the toilet paper before the customer's 108 current supply of the toilet paper is depleted. However, if the customer 108 would not like to receive additional inventory of the item 110 (e.g., toilet paper), the customer 108 may cancel the order, such via a website/mobile application associated with the entity 106, a voice command audibly uttered by the customer 108, an e-mail/text message, and so on. In some embodiments, the notification may be sent to the customer 108 prior to additional inventory of the item 110 being ordered. For instance, the entity may send a notification to the customer 108 indicating that the amount remaining of the item 110 is low and to inquire whether the customer 108 would like to order additional inventory of the item 110. That way, the customer 108 may decide whether he/she would like to place an order for additional inventory of the item 110.

In some embodiments, the determination of whether to trigger a reorder of an item 110 for a customer 108 may be based on the presence of multiple reorder devices 102 associated with the customer 108, and possibly located at the same location. For instance, the same room, floor, building, etc., may have multiple reorder devices 102 devoted to or associated with a different item. For instance, a stockroom in an office may have a first reorder device 102 associated with printer paper, a second reorder device 102 associated with pens, a third reorder device 102 associated with paper clips, and so on. Similarly, a residence of a customer 108 may have a first reorder device 102 associated with diapers, a second reorder device 102 associated with dog food, a third reorder device 102 associated with toilet paper, and so on. On the other hand, a location (e.g., a floor, building, etc.) may have multiple reorder devices 102 that are associated with the same item 110. For instance, a business office may have multiple stockrooms that each contain reorder device 102 associated with printer paper, or each floor may have a printer paper reorder device 102. When determining whether a reorder of an item 110 should be triggered, the entity 106 may consider the supply of the item 110 with respect to other reorder devices 102 associated with the customer 108. For instance, the entity 106 may consider whether there is adequate supply of the item 110 in other areas that could possibly be used to replenish the supply of the item 110 in an area that is close to being depleted. Provided that multiple reorder devices 102 are associated with the customer 108, the entity 106 may also associate the reorder devices 102 with a specific location (e.g., a first stock room and a second stock room, a first floor and a second floor, a first building and a second building, etc.).

In various embodiments, once the association between an item 110 and a reorder device 102 is determined, the association may be maintained or locked with respect to that item 110, such that a particular reorder device 102 is associated with a particular item 110 and/or a particular item 110 is associated with a particular reorder device 102. That way, provided that a reorder device 102 is initially associated with toilet paper, a child may not subsequently associate a different item 110 (e.g., cookies, candy, etc.) with that reorder device 102, unless the customer 108 has authorized/enabled specific items 110 to be associated with that reorder device 102. The entity 106 may read/write the item tags 112 so that a particular item tag 112 may be locked to a specific reorder device 102. In some embodiments, a reorder device 102 may be initially unlocked, and once the reorder device 102 is associated with a particular item 110, the reorder device 102 may become locked. In order to unlock the reorder device 102 and allow a different item 110 to be associated with that reorder device 102, the customer 108 may have to register or set up the reorder device 102 a second time. In certain embodiments, the customer 108 may register or set up the reorder device 102, or lock/unlock the reorder device 102, by inputting various types of information. For instance, the customer 108 may input a pin (e.g., a set of numerical characters) or other identifying information (e.g., a username, a password, a name, etc.) using a website and/or mobile application associated with the entity 106, which may be accessible via a display of a customer device. Alternatively, the customer 108 may audibly utter a voice command that includes the identifying information and that is captured by one or more microphones of a device associated with the customer 108 (e.g., the reorder device 102, a mobile telephone, a voice-controlled device, etc.).

Figure 5:
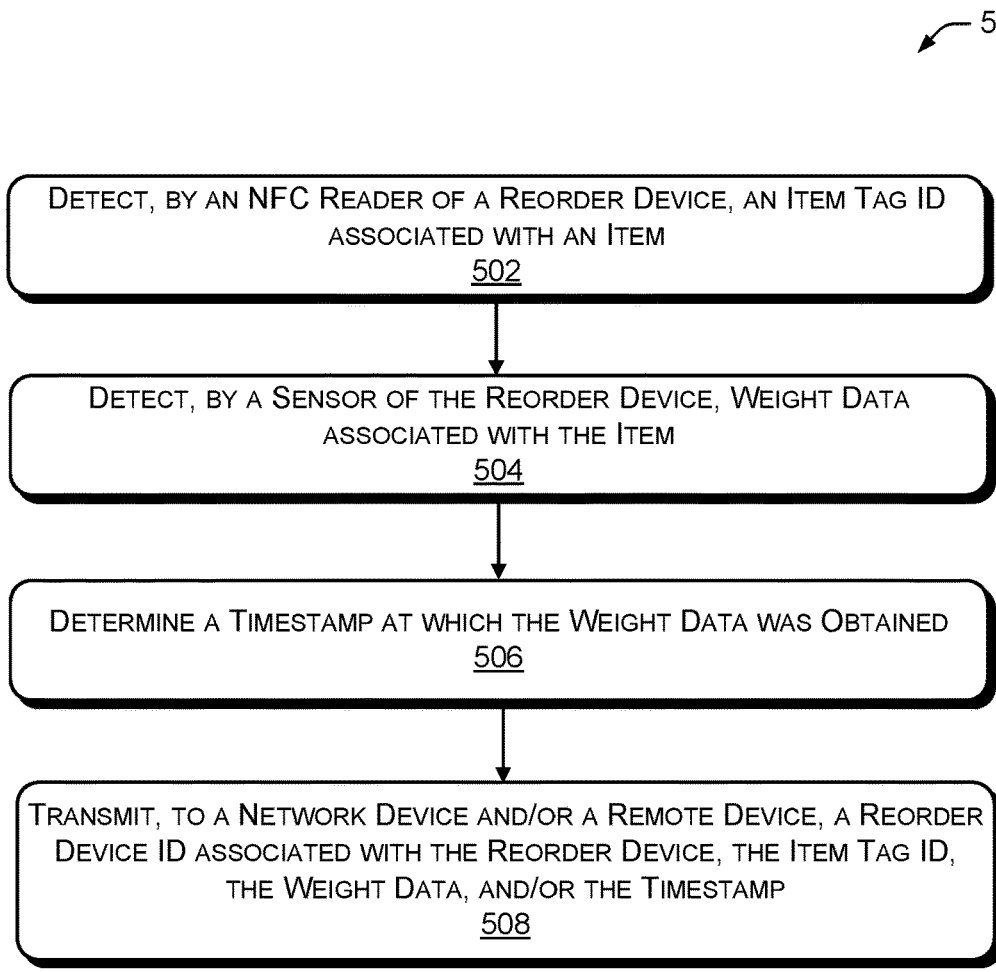
FIG. 5 is a flow diagram of an illustrative process to capture and transmit weight data associated with items placed on a reorder device.
Figure 6:
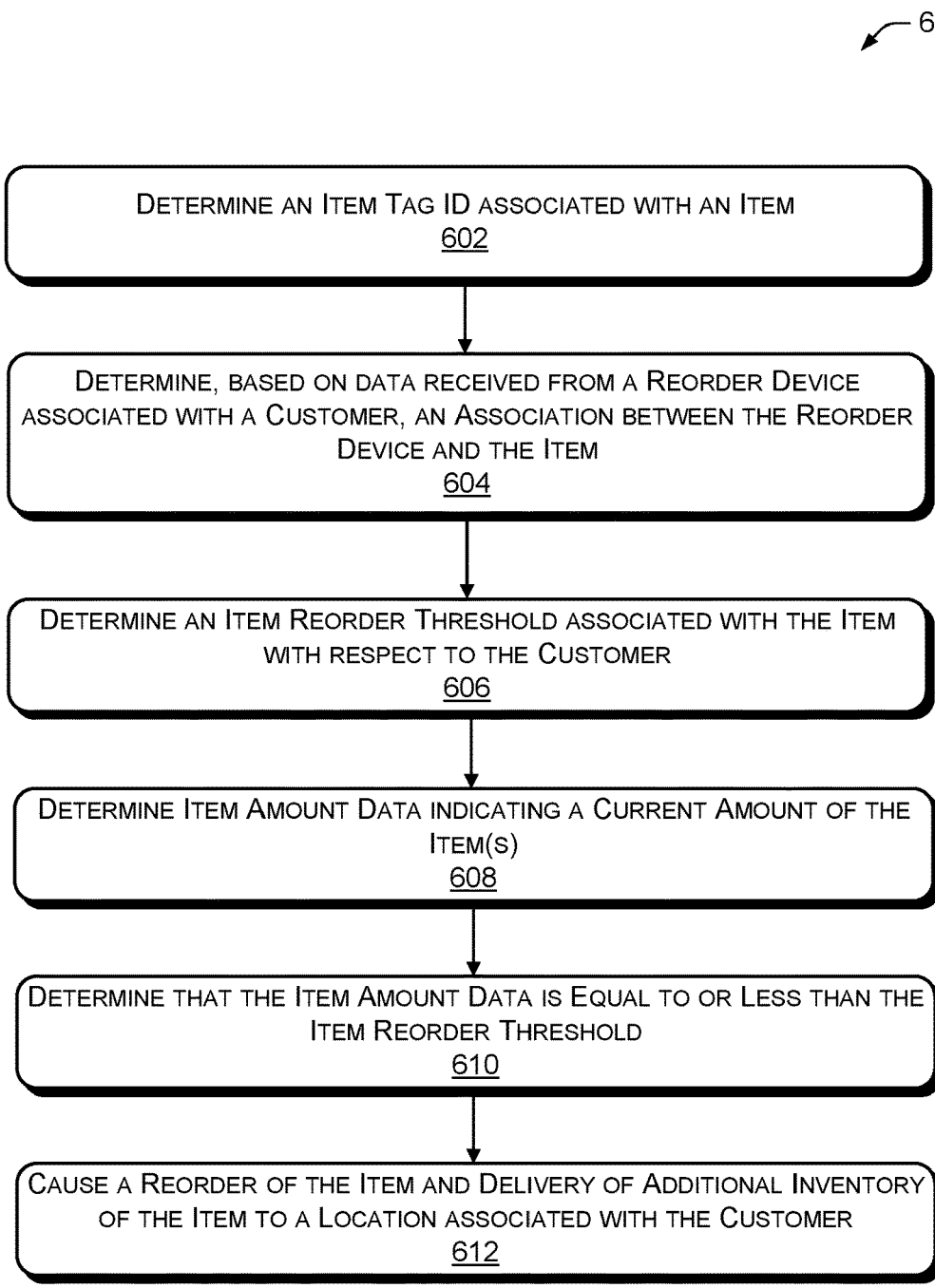
FIG. 6 is a flow diagram of an illustrative process to facilitate the reordering of an item for a customer based on data received from a reorder device associated with the customer.

FIGS. 5 and 6 illustrate example processes for facilitating the reorder of an item for a customer based on data collected and transmitted by a reorder device. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 illustrates a flow diagram of an example process 500 of collecting/obtaining weight data associated with an item placed on a reorder device, and transmitting the weight data to one or more entity devices for the purpose of facilitating a reorder of the item for a customer. Moreover, the following actions described with respect to FIG. 5 may be performed by one or more reorder devices 102, as illustrated with respect to FIGS. 1-4.

Block 502 illustrates detecting, by an NFC reader of a reorder device, an item tag ID associated with an item. In certain embodiments, a customer 108 may elect to participate in a service in which the entity 106 automatically reorders items 110 for the customer 108, without the customer 108 having to place an order for additional inventory of the item 110. The reorder device 102 of the customer 108 may have an item tag reader 306, such as an NFC reader, that is configured to detect an item tag 112 (e.g., an NFC tag) associated with the item 110. The customer 108 may place the item 110 on the top surface 202 of the reorder device 102, and the NFC tag may be placed on the top surface 202 or a side surface 204 of the reorder device 102, on the item 110 itself, and/or on a container 208 that is placed on the top surface 202 of the reorder device 102 and that contains the item 110.

Block 504 illustrates detecting, by a sensor of the reorder device, weight data associated with the item. After the item 110 (or the container 208 and item 110) is placed on the top surface 202 of the reorder device 102, the sensor(s) 308 of the reorder device 102, such as one or more weight sensors 308, may detect/obtain weight measurements of the items 110 placed on the reorder device 102. The weight data may correspond to mass/weight of the items 110, with or without considering any packaging of the item 110 and/or a container 208 in which the items 110 are placed within. As stated herein, the current amount of the item 110 may be a current weight of the item 110, a current volume of the item 110, and/or a current number/quantity of the item 110. The current amount of the item 110 may be based on weight sensors 308, pressure sensors 308, and/or image/video data captured by one or more cameras.

Block 506 illustrates determining a timestamp at which the weight data was obtained. The reorder device 102 may include one or more timers 312 that maintain the current time. Accordingly, the reorder device 102 may determine a specific time at which individual weight measurements of the items 110 are obtained/collected by the sensor(s) 308 of the reorder device 102.

Block 508 illustrates transmitting, to a network device and/or a remote device, a reorder device ID associated with the reorder device, the item tag ID, the weight data, and/or the timestamp. In various embodiments, via WiFi, Bluetooth, a cellular connection, etc., the reorder device 102 may transmit the reorder device ID 120 associated with the reorder device 102, the item tag ID 122 associated with the item 110, the item weight data 124 of the item 110 obtained by the reorder device 102, and/or the timestamp data 126 that indicates a time at which the item weight data 124 was obtained to a network device and/or the entity server(s) 104 associated with the entity 106.

FIG. 6 illustrates a flow diagram of an example process 600 of facilitating the reorder of an item for a customer based on weight data obtained and sent by a reorder device of the customer. Moreover, the following actions described with respect to FIG. 6 may be performed by the reorder device 102 and/or the entity device(s) 104/entity 106, as illustrated with respect to FIGS. 1-4.

Block 602 illustrates determining an item tag associated with an item. In some embodiments, a customer 108 may elect to participate in a service in which the entity 106 automatically reorders items 110 for the customer 108, without the customer 108 having to place an order for additional inventory of the item 110. For an item 110 that the customer 108 would like to automatically reorder, the entity 106 may generate and/or send an item tag 112 associated with the item 110 to the customer 108. The item tag 112 may be an NFC tag that is included within an item label 210 associated with the item 110. The customer 108 may place the item(s) 110 on a top surface 202 of the reorder device 102, and may place the item tag 112/item label 210 on the reorder device 102, the item 110 itself, or a container 208 that contains the item(s) 110 and that is placed on the reorder device 102.

Block 604 illustrates determining, based on data received from a reorder device associated with a customer, an association between the reorder device and the item. Upon the customer 108 placing the item tag 112 in proximity to, or within a threshold distance from, the item tag reader 306 (e.g., NFC reader) of the reorder device 102, the item tag reader 306 may detect the item tag 112. The reorder device 102 may send the reorder ID 120 of the reorder device 102 and the item tag ID 122 to a network device local to the reorder device 102 and/or an entity device 104 that is located remotely from the reorder device 102. The entity 106 may have previously associated the reorder device 102 with the customer 108, and the item tag 112 with the item 110. Accordingly, the entity 106 may determine that the customer 108 has placed the item 110 on the reorder device 102. Instead of, or in addition to, using an item tag reader 306, the item 110 may be associated with the reorder device 102 based on data/information input by the customer 108 via a mobile application/website associated with the entity 106.

Block 606 illustrates determining an item reorder threshold associated with the item with respect to the customer. In various embodiments, the entity 106 may determine an item reorder threshold 416, which indicates a point at which the entity 106 is to facilitate the reorder of additional inventory of the item 110 for the customer 108. The item reorder threshold 416 for the item 110 may be a particular weight or amount of the item 110 that currently is placed on the reorder device 102. Moreover, the item reorder threshold 416 may be based on various types of data, including data relating to the customer 108 and/or other customers 108.

Block 608 illustrates determining item amount data indicating a current amount of the item(s). After the item(s) 110 are placed on the reorder device 102, the reorder device 102 may periodically measure/obtain/collect data relating to the item(s) 110 that have been placed on the reorder device 102, where the data may include a current weight of the item(s) 110, a current volume of the item(s) 110, and/or a current number/quantity of the item(s) 110. The reorder device 102 may send, to a network device and/or the entity device(s) 104, the reorder device ID 120, the item tag ID 122, the item weight data 124, and/or a timestamp 126 that indicates a time at which the weight measurements of the item(s) 110 were obtained/collected by the reorder device 102. The data may be collected/sent by the reorder device 102 at various intervals (e.g., hourly, daily, etc.), which may be modified by the reorder device 102 and/or the entity device(s) 104.

Block 610 illustrates determining that the item amount data is equal to or less than the item reorder threshold. In various embodiments, the entity 106 may determine that the current weight of the item(s) 110 placed on the reorder device 102 is equal to or less than a threshold weight (e.g., 4 ounces) or threshold percentage (e.g., 20%, 30%, etc.). In other embodiments, the reorder device 102 may not transmit the item amount data to the entity device(s) 104, and may instead itself determine that the item amount data is equal to or less than the item reorder threshold 416.

Block 612 illustrates causing a reorder of the item and delivery of additional inventory of the item to a location associated with the customer. As a result of the weight data of the item 110 being equal to or less than the item threshold value 416, the entity 106 may determine that a current supply of the item 110 for the customer 108 is becoming depleted (e.g., running low). Accordingly, the entity 106 may place a reorder of the item 110 for the customer 108, such as by causing additional inventory of the item 110 to be ordered for the customer 108 and delivered to a location of the customer 108. The entity 106 may supply the additional inventory of the item 110 or the entity 106 may instruct a third party merchant to provide/deliver the additional inventory of the item 110 to the customer 108. As a result, the customer 108 is likely to receive the additional inventory of the item 110 before the customer's 108 current supply of the item 110 is depleted, without the customer 108 having to place an order for the item 110.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   memory;
   one or more processors; and
   one or more computer-executable instructions stored in the memory and executable by the one or more processors to perform operations comprising:
   receiving, from a customer device of a customer, an indication that the customer agrees to participate in a service in which a product is automatically reordered by an entity on behalf of the customer;
   determining an indication that a near field communication (NFC) reader of a reorder device associated with the customer has detected an NFC tag associated with the product;
   receiving, from the reorder device and based on the NFC reader detecting the NFC tag, a reorder device identifier (ID) associated with the reorder device and an NFC tag ID associated with the product;
   automatically associating, without input from the customer and based on the NFC reader detecting the NFC tag, the reorder device ID, and the NFC tag ID, the reorder device and the product;
   determining a reorder threshold value for the product based on a type of the product and a rate at which other customers have used the product, the reorder threshold value corresponding to a percentage of the product that is remaining on a top surface of the reorder device;
   receiving, from the reorder device, weight data indicating a current weight of the product and a timestamp indicating a time at which the weight data was obtained, the weight data being captured by one or more weight sensors that are located within or underneath the top surface of the reorder device in which the product is placed;

determining that the current weight is equal to or less than the reorder threshold value;

causing additional inventory of the product to be ordered and delivered to a location associated with the customer; and sending, to the customer, a notification indicating that the product has been reordered and that the customer has been charged for the additional inventory of the product.

2. The system as recited in claim 1, further comprising one or more additional computer-executable instructions that are executable by the one or more processors to determine the reorder threshold value using one or more machine learning algorithms, wherein the type of the product includes a perishability of the product, a size of the product as packaged, or a number of the product in a package.

3. The system as recited in claim 1, further comprising one or more additional computer-executable instructions that are executable by the one or more processors to:

receive, from the reorder device and subsequent to the time, additional weight data indicating one or more weights of the product;

determine, based on the additional weight data, a rate at which the customer is using the product; and adjust, based on the rate at which the customer is using the product, the reorder threshold value for the customer.

4. The system as recited in claim 1, wherein the NFC tag is incorporated within a product label that identifies the product and that is placed on at least one of the product, the reorder device, or a container that contains the product and that is placed on the top surface of the reorder device.

5. The system as recited in claim 1, further comprising one or more additional computer-executable instructions that are executable by the one or more processors to:

determine, based on at least one of the weight data or additional weight data provided by the reorder device, a rate at which the customer is using the product;

predict, based on the rate at which the customer is using the product, an amount of time until a current inventory of the product will be depleted; and place an order for the additional inventory of the product based on the amount of time.

6. A method comprising:

receiving, from a customer device of customer, an indication that the customer agrees to participate in a service in which an item is automatically reordered by an entity on behalf of the customer;

determining an indication that an item tag reader of a reorder device of the customer has detected an item tag that identifies the item;

receiving, from the reorder device and in response to the item tag reader of the reorder device detecting the item tag, a reorder device identifier (ID) associated with the reorder device and an item ID associated with the item;

automatically associating, without input from the customer and based at least in part on the item tag reader of the reorder device detecting the item tag, the reorder device ID, and the item ID, the reorder device with the item;

determining a reorder threshold value for the item based at least in part on a type of the item, a first rate at which the customer has previously used the item, and a second rate at which other customers that are different than the customer have used the item, the reorder threshold value corresponding to a percentage of the item that is remaining on a top surface of the reorder device;

receiving, from the reorder device, item data indicating a current weight of the item placed on the reorder device and timestamp data indicating a time at which the item data was obtained, the item data being captured by one or more weight sensors that are located within or underneath the top surface of the reorder device in which the item is placed;

determining that the current weight is equal to or less than the reorder threshold value;

creating an order for an additional amount of the item to be delivered to a location associated with the customer; and sending, to the customer, a notification indicating that the item has been reordered and that the customer has been charged for the additional inventory of the item.

7. The method as recited in claim 6, wherein the type of the item includes at least one of a perishability of the item, a size of the item as packaged, or a number of the item in a package.

8. The method as recited in claim 6, wherein at least one of:

the reorder threshold value corresponds to at least one of a threshold weight of the item or a first percentage of the item that is remaining on the top surface of the reorder device;

the item data further indicates a current volume of the item and the reorder threshold value further corresponds to at least one of a threshold volume of the item or a second percentage of the item that is remaining on the top surface of the reorder device; or the item data further indicates a current number or quantity of the item and the reorder threshold value corresponds to at least one of a threshold number or quantity of the item or a third percentage of the item that is remaining on the top surface of the reorder device.

9. The method as recited in claim 6, wherein determining that the current weight is equal to or less than the reorder threshold value comprises:

determining, at a first time, an initial weight of the item, the initial weight of the item being a known weight of the item or being based at least in part on the current weight of the item determined by the reorder device; and comparing, at a second time that is subsequent to the first time, the current weight of the item to the initial weight of the item.

10. The method as recited in claim 6, further comprising:

determining, based at least in part on the second rate at which the customer has used the item, an updated reorder threshold value.

11. The method as recited in claim 6, wherein the item ID is an item tag ID associated with the item tag, wherein the item tag reader is a near field communication (NFC) reader, and wherein the item tag ID corresponds to an NFC tag that is associated with the item and that is detected by the NFC reader of the reorder device.

12. The method as recited in claim 6, further comprising:

determining, based at least in part on at least one of the item data or additional item data provided by the reorder device, a third rate at which the customer is currently using the item;

predicting, based at least in part on the third rate at which the customer is currently using the item, an amount of time until a current inventory of the item will be depleted; and placing the order based at least in part on the amount of time.

13. The method as recited in claim 6, wherein the one or more weight sensors periodically measure the current weight of the item at predetermined intervals.

14. A system comprising:
memory;
one or more processors; and
one or more computer-executable instructions stored in the memory and executable by the one or more processors to perform operations comprising:
receiving, from a customer device of customer, an indication that the customer agrees to participate in a service in which an item is automatically reordered by an entity on behalf of the customer;
determining an indication that an item tag reader of a reorder device of the customer has detected an item tag that identifies the item;
receiving, from the reorder device and in response to the item tag reader of the reorder device detecting the item tag, a reorder device identifier (ID) associated with the reorder device and an item ID associated with the item;
automatically associating, without input from the customer and based at least in part on the item tag reader of the reorder device detecting the item tag, the reorder device (ID), and the item ID, the reorder device with the item;
receiving, from the reorder device, item data indicating a current weight of the item placed on the reorder device and timestamp data indicating a time at which the item data was determined, the item data being captured by one or more weight sensors that are located within or underneath a top surface of the reorder device in which the item is placed;
determining a reorder threshold value associated with the item based at least in part on a type of the item, a first rate at which the customer has previously used the item, and a second rate at which one or more other customers that are different than the customer have used the item, the reorder threshold value corresponding to a percentage of the item that is remaining on the top surface of the reorder device;
determining that the current weight is equal to or less than the reorder threshold value; and
causing fulfilment of an order for an additional amount of the item to be delivered to a location associated with the customer.

15. The system as recited in claim 14, wherein the type of the item includes at least one of a perishability of the item, a size of the item as packaged, or a number of the item in a package.

16. The system as recited in claim 14, wherein at least one of:

the reorder threshold value corresponds to at least one of a threshold weight of the item or a first percentage of the item that is remaining on the top surface of the reorder device;
the item data further indicates a current volume of the item and the reorder threshold value corresponds to at least one of a threshold volume of the item or a second percentage of the item that is remaining on the top surface of the reorder device; or
the item data further indicates a current number or quantity of the item and the reorder threshold value corresponds to at least one of a threshold number or quantity of the item or a third percentage of the item that is remaining on the top surface of the reorder device.

17. The system as recited in claim 14, wherein determining that the current weight is equal to or less than the reorder threshold value comprises:
determining, at a first time, an initial weight of the item, the initial weight of the item being a known weight of the item or being based at least in part on the current weight of the item determined by the reorder device; and
comparing, at a second time that is subsequent to the first time, the current weight of the item to the initial weight of the item.

18. The system as recited in claim 14, further comprising one or more additional computer-executable instructions that are executable by the one or more processors to:
determine, based at least in part on the second rate at which the one or more other customers have used the item, an updated reorder threshold value.

19. The system as recited in claim 14, further comprising one or more additional computer-executable instructions that are executable by the one or more processors to:
determine, based at least in part on at least one of the item data or additional item data provided by the reorder device, the second rate at which the one or more other customers are using the item;
predict, based at least in part on the second rate at which the one or more other customers are using the item, an amount of time until a current inventory of the item will be depleted; and
place the order based at least in part on the amount of time.

20. The system as recited in claim 14, further comprising sending, to a customer device of the customer, a notification indicating that the item has been reordered and that the customer has been charged for the additional amount of the item.

* * * * *